US008874741B2

(12) United States Patent
Hassan et al.

(10) Patent No.: US 8,874,741 B2
(45) Date of Patent: Oct. 28, 2014

(54) SECURED REMOTE MANAGEMENT OF A HOME NETWORK

(75) Inventors: Omar Hassan, Kirkland, WA (US); Samir M. Hodroj, Bothell, WA (US); Senthil Kumar Velusamy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 101 days.

(21) Appl. No.: 12/692,535

(22) Filed: Jan. 22, 2010

(65) Prior Publication Data

US 2011/0125898 A1  May 26, 2011

Related U.S. Application Data

(60) Provisional application No. 61/264,627, filed on Nov. 25, 2009.

(51) Int. Cl.
 *G06F 15/173* (2006.01)
(52) U.S. Cl.
 USPC .......................................... 709/225; 709/223
(58) Field of Classification Search
 CPC ........ G06F 21/00; H04L 67/025; H04L 12/66
 See application file for complete search history.

(56) References Cited

U.S. PATENT DOCUMENTS

| 4,475,806 | A  | 10/1984 | Daughton et al. |
| 5,555,077 | A  | 9/1996  | Schooley |
| 6,052,725 | A  | 4/2000  | McCann et al. |
| 6,141,341 | A  | 10/2000 | Jones et al. |
| 6,310,634 | B1 | 10/2001 | Bodnar et al. |
| 6,366,302 | B1 | 4/2002  | Crosby et al. |
| 6,598,183 | B1 | 7/2003  | Grieco et al. |
| 6,633,571 | B1 | 10/2003 | Sakamoto et al. |
| 6,671,729 | B1 | 12/2003 | Gordon et al. |
| 6,675,208 | B1 | 1/2004  | Rai et al. |
| 6,680,922 | B1 | 1/2004  | Jorgensen |
| 6,704,282 | B1 | 3/2004  | Sun et al. |
| 6,754,844 | B1 | 6/2004  | Mitchell |
| 6,773,396 | B2 | 8/2004  | Flach et al. |
| 6,778,498 | B2 | 8/2004  | McDysan |
| 6,810,263 | B1 | 10/2004 | Cheng et al. |
| 6,886,060 | B2 | 4/2005  | Wang et al. |

(Continued)

FOREIGN PATENT DOCUMENTS

| KR | 1020060039825 A | 5/2006 |
| KR | 1020060053934 A | 5/2006 |
| KR | 1020090011502 A | 2/2009 |
| KR |    100901967 B1 | 6/2009 |

OTHER PUBLICATIONS

"Cisco Smart Care Service," retrieved at <<http://www.cisco.com/en/US/products/ps7343/serv_group_home.html>> on Jan. 22, 2010, available as early as Dec. 4, 2009, 1 pg.

(Continued)

*Primary Examiner* — Peling Shaw
(74) *Attorney, Agent, or Firm* — Lee & Hayes, PLLC

(57) ABSTRACT

A home router and remote service provider configured to establish a network tunnel and utilize the network tunnel to remotely manage the home router are disclosed herein. The home router and remote service provider may also utilize the network tunnel to remotely manage at least one other device that is locally connected or coupled to the home router.

19 Claims, 13 Drawing Sheets

(56) References Cited

U.S. PATENT DOCUMENTS

| | | | |
|---|---|---|---|
| 7,136,709 B2 | 11/2006 | Arling et al. | |
| 7,149,792 B1 | 12/2006 | Hansen et al. | |
| 7,151,780 B1 | 12/2006 | Belscher et al. | |
| 7,155,305 B2 | 12/2006 | Hayes et al. | |
| 7,188,002 B2 | 3/2007 | Chapman, Jr. et al. | |
| 7,209,479 B2 | 4/2007 | Larson | |
| 7,252,230 B1 | 8/2007 | Sheikh et al. | |
| 7,257,741 B1 | 8/2007 | Palenik et al. | |
| 7,675,537 B2 | 3/2010 | Wilson et al. | |
| 7,853,560 B1 | 12/2010 | Sivalingham et al. | |
| 8,019,067 B2 | 9/2011 | Cadiz et al. | |
| 2001/0010516 A1 | 8/2001 | Roh et al. | |
| 2002/0131402 A1 | 9/2002 | Lee et al. | |
| 2003/0035523 A1 | 2/2003 | Mansfield | |
| 2003/0088698 A1 | 5/2003 | Singh et al. | |
| 2003/0101459 A1 | 5/2003 | Edson | |
| 2004/0034702 A1* | 2/2004 | He | 709/224 |
| 2004/0052045 A1 | 3/2004 | Botchek | |
| 2004/0132500 A1 | 7/2004 | Rogalski et al. | |
| 2004/0142711 A1 | 7/2004 | Mahonen et al. | |
| 2004/0255192 A1 | 12/2004 | Watanabe et al. | |
| 2005/0044235 A1 | 2/2005 | Balahura et al. | |
| 2005/0071183 A1 | 3/2005 | Horigami et al. | |
| 2005/0107086 A1 | 5/2005 | Tell et al. | |
| 2005/0114500 A1 | 5/2005 | Monk et al. | |
| 2005/0114534 A1 | 5/2005 | Lee | |
| 2005/0232284 A1 | 10/2005 | Karaoguz et al. | |
| 2005/0233743 A1 | 10/2005 | Karaoguz et al. | |
| 2005/0271001 A1 | 12/2005 | Thermond | |
| 2005/0281577 A1 | 12/2005 | Tamura et al. | |
| 2006/0101515 A1 | 5/2006 | Amoroso et al. | |
| 2006/0230183 A1 | 10/2006 | Zhu et al. | |
| 2006/0230446 A1 | 10/2006 | Vu | |
| 2006/0236388 A1 | 10/2006 | Ying et al. | |
| 2006/0260752 A1 | 11/2006 | Crum | |
| 2006/0262935 A1 | 11/2006 | Goose et al. | |
| 2007/0050673 A1 | 3/2007 | DiBartolomeo et al. | |
| 2007/0078941 A1 | 4/2007 | Dun et al. | |
| 2007/0105548 A1 | 5/2007 | Mohan et al. | |
| 2007/0113275 A1 | 5/2007 | Khanna et al. | |
| 2007/0186180 A1 | 8/2007 | Morgan | |
| 2007/0191057 A1 | 8/2007 | Kamada | |
| 2007/0195805 A1 | 8/2007 | Lindgren | |
| 2007/0199066 A1* | 8/2007 | Smith et al. | 726/15 |
| 2007/0210101 A1 | 9/2007 | Hammond et al. | |
| 2007/0218912 A1 | 9/2007 | Song et al. | |
| 2007/0237159 A1* | 10/2007 | Yamada et al. | 370/395.53 |
| 2007/0250761 A1 | 10/2007 | Bradley et al. | |
| 2007/0260751 A1 | 11/2007 | Meesseman | |
| 2007/0266107 A1 | 11/2007 | Friend et al. | |
| 2007/0271532 A1 | 11/2007 | Nguyen et al. | |
| 2007/0271606 A1 | 11/2007 | Amann et al. | |
| 2007/0280247 A1 | 12/2007 | Mera et al. | |
| 2008/0005791 A1 | 1/2008 | Gupta et al. | |
| 2008/0022377 A1 | 1/2008 | Chen et al. | |
| 2008/0028225 A1 | 1/2008 | Eckert et al. | |
| 2008/0043640 A1 | 2/2008 | Smith et al. | |
| 2008/0076425 A1 | 3/2008 | Khetawat et al. | |
| 2008/0133775 A1 | 6/2008 | Peterson et al. | |
| 2008/0216167 A1 | 9/2008 | Imai et al. | |
| 2008/0254807 A1 | 10/2008 | Duplessis et al. | |
| 2008/0311959 A1* | 12/2008 | Wang et al. | 455/566 |
| 2009/0029676 A1 | 1/2009 | Thalapaneni et al. | |
| 2009/0059907 A1 | 3/2009 | Sindhwani et al. | |
| 2009/0131018 A1 | 5/2009 | Osborn | |
| 2009/0143052 A1 | 6/2009 | Bates et al. | |
| 2009/0156213 A1 | 6/2009 | Spinelli et al. | |
| 2009/0157732 A1 | 6/2009 | Hao et al. | |
| 2009/0193469 A1 | 7/2009 | Igarashi | |
| 2009/0237573 A1 | 9/2009 | Hornback et al. | |
| 2009/0282470 A1 | 11/2009 | Yang et al. | |
| 2009/0327354 A1 | 12/2009 | Resnick et al. | |
| 2010/0014518 A1 | 1/2010 | Duncan et al. | |
| 2010/0082759 A1 | 4/2010 | Nalliah et al. | |
| 2010/0180206 A1 | 7/2010 | Silva, Jr. et al. | |
| 2010/0217837 A1* | 8/2010 | Ansari et al. | 709/218 |
| 2010/0260173 A1 | 10/2010 | Johnson | |
| 2010/0273534 A1 | 10/2010 | Strom | |
| 2010/0312759 A1 | 12/2010 | Groethe et al. | |
| 2011/0122774 A1 | 5/2011 | Hassan et al. | |
| 2011/0199338 A1 | 8/2011 | Kim | |

OTHER PUBLICATIONS

"Microsoft Windows SlideShow," retreived at <<http://www.microsoft.com/windows/windows-vista/features/sideshow.aspx >> on Jan. 21, 2010, available as early as Dec. 4, 2009, 4 pgs.

Haruyama, et al., "Dial-to-Connect VPN System for Remote DLNA Communication", IEEE Consumer Communications and Networking Conference, Jan. 10-12, 2008, pp. 1224-1225.

PCT Search Report and Written Opinion mailed Jun. 29, 2011 for PCT Application No. PCT/US2010/057343, 8 pgs.

PCT Search Report and Written Opinion mailed Jul. 26, 2011 for PCT Application No. PCT/US2010/057466, 10 pgs.

PCT Search Report and Written Opinion mailed Jul. 26, 2011 for PCT Application No. PCT/US2010/057348, 11 pgs.

PCT Search Report and Written Opinion mailed Jul. 27, 2011 for PCT Application No. PCT/US2010/057086, 10 pgs.

PCT Search Report and Written Opinion mailed Jul. 28, 2011 for PCT Application No. PCT/US2010/057473, 9 pgs.

Office Action for U.S. Appl. No. 12/692,498, mailed on Feb. 17, 2012, Brock et al., "Router Management via Touch-Sensitive Display", 24 pages.

Office Action for U.S. Appl. No. 12/692,541 mailed on Mar. 15, 2012, Bouthemy et al., "Secured Registration of a Home Network Device", 10 pages.

Non-Final Office Action for U.S. Appl. No. 12/692,551, mailed Mar. 2, 2012, Omar Hassan et al., "Time or Condition-Based Reestablishment of a Secure Connection", 16 pages.

Non-Final Office Action for U.S. Appl. No. 12/692,509, Samir M. Hodroj et al., "Router-Based Home Network Synchronization", mailed on May 22, 2012, 10 pages.

Non-Final Office Action for U.S. Appl. No. 12/692,498, mailed on Jul. 18, 2013, Brock et al., "Router Management via Touch-Sensitive Display", 21 pages.

Final Office Action for U.S. Appl. No. 12/692,509, mailed Oct. 16, 2012, Samir M. Hodroj et al., "Router-Based Home Network Synchronization", 13 pages.

Office Action for U.S. Appl. No. 12/692,498, mailed on Jun. 27, 2012, Brock et al., "Router Management via Touch-Sensitive Display", 24 pages.

Final Office Action for U.S. Appl. No. 12/692,551, mailed Jul. 31, 2012, Omar Hassan et al., "Time or Condition-Based Reestablishment of a Secure Connection", 20 pages.

The Extended European Search Report mailed Mar. 3, 2014 for European patent application No. 10833799.9, 5 pages.

Office Action for U.S. Appl. No. 12/692,551, mailed on Jan. 29, 2014, Omar Hassan, "Time or Condition-Based Reestablishment of a Secure Connection", 23 pages.

Office action for U.S. Appl. No. 12/692,498, mailed on Jan. 30, 2014, Brock et al., "Router Management via Touch-Sensitive Display", 22 pages.

Final Office Action for U.S. Appl. No. 12/692,498, mailed on Nov. 21, 2013, Yaro Brock, "Router Management via Touch-Sensitive Display", 23 pages.

Office action for U.S. Appl. No. 12/692,551, mailed on Jun. 25, 2014, Hassan et al., "Time or Condition-Based Reestablishment of a Secure Connection", 22 pages.

Office action for U.S. Appl. No. 12/692,509, mailed on Sep. 12, 2014, Hodroj et al., "Router-Based Home Network Synchronization", 9 pages.

* cited by examiner

SECURED REMOTE MANAGEMENT OF A HOME NETWORK

RELATED APPLICATIONS

This application claims priority to U.S. Provisional Application No. 61/264,627, entitled "Connected Home" and filed on Nov. 25, 2009. Application No. 61/264,627 is fully incorporated herein by this reference.

BACKGROUND

Increasingly, a variety of networks for a variety of modes of communication are being consolidated into a single network for those modes. Previously, phone calls have been transmitted over circuit-switched networks, while electronic messages have been transmitted over data networks, such as the Internet. Multiple devices that reside in the same home have used such disparate networks and thus have not been in communication with one another. To enable this variety of communication modes to share a common network, a number of communication service provider have adopted Session Initiation Protocol (SIP) to initiate or terminate Internet Protocol (IP) services. Some service providers have deployed Internet Protocol Multimedia Subsystem (IMS), an architectural framework for delivering Internet Protocol (IP) multimedia services using SIP as a major protocol, within their IP networks. SIP enabled phone (or IMS enabled phone) calls, electronic messages, and other voice and data communications to be transmitted together over a common data network. An alternative is to rely on the Extensible Messaging and Presence Protocol (XMPP) for these services.

This consolidation of communication modes raises concerns about security. Communications such as phone calls have not previously been exposed to the security weaknesses of data networks. A number of security mechanisms are used for securing communications across data networks, however. Virtual Private Networks (VPNs), for example, have been use to create a secure connection between two devices located remotely from one another and connected via a public data network. These VPNs include network tunnels associated with data packets that have been encrypted using the Internet Protocol Security (IPSec) protocol suite.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for remotely managing computing and telecommunication devices. The devices being managed belong to a local or personal network (hereinafter "home network") and are managed through a router of that home network. The server providing the remote management is part of a service provider network. That service provider network is associated with a service provider that offers services subscribed to by the devices and router of the home network. To ensure that the remote management is provided in a secure manner, the router and server establish and maintain a secure connection, such as a network tunnel of a VPN, between them. Once this network tunnel is established, the server provides remote management in the form of commands and data. These commands and data are then executed on the router, on a device, or both to remotely manage the router, device, or both. The commands and data can be associated with maintenance, repair, updates, or configuration or setting changes.

In one example scenario, a device of the home network does not function properly and its user contacts the service provider for help. The service provider then causes a secure connection to be established or instructs the user to take some action which will cause the establishment of the secure connection. Once the secure connection is established, the service provider diagnoses the cause of the problem—e.g., outdated software on the device and the router. The service provider then provides a software update to the device and the router, fixing the problem.

Overview

Figure 1:
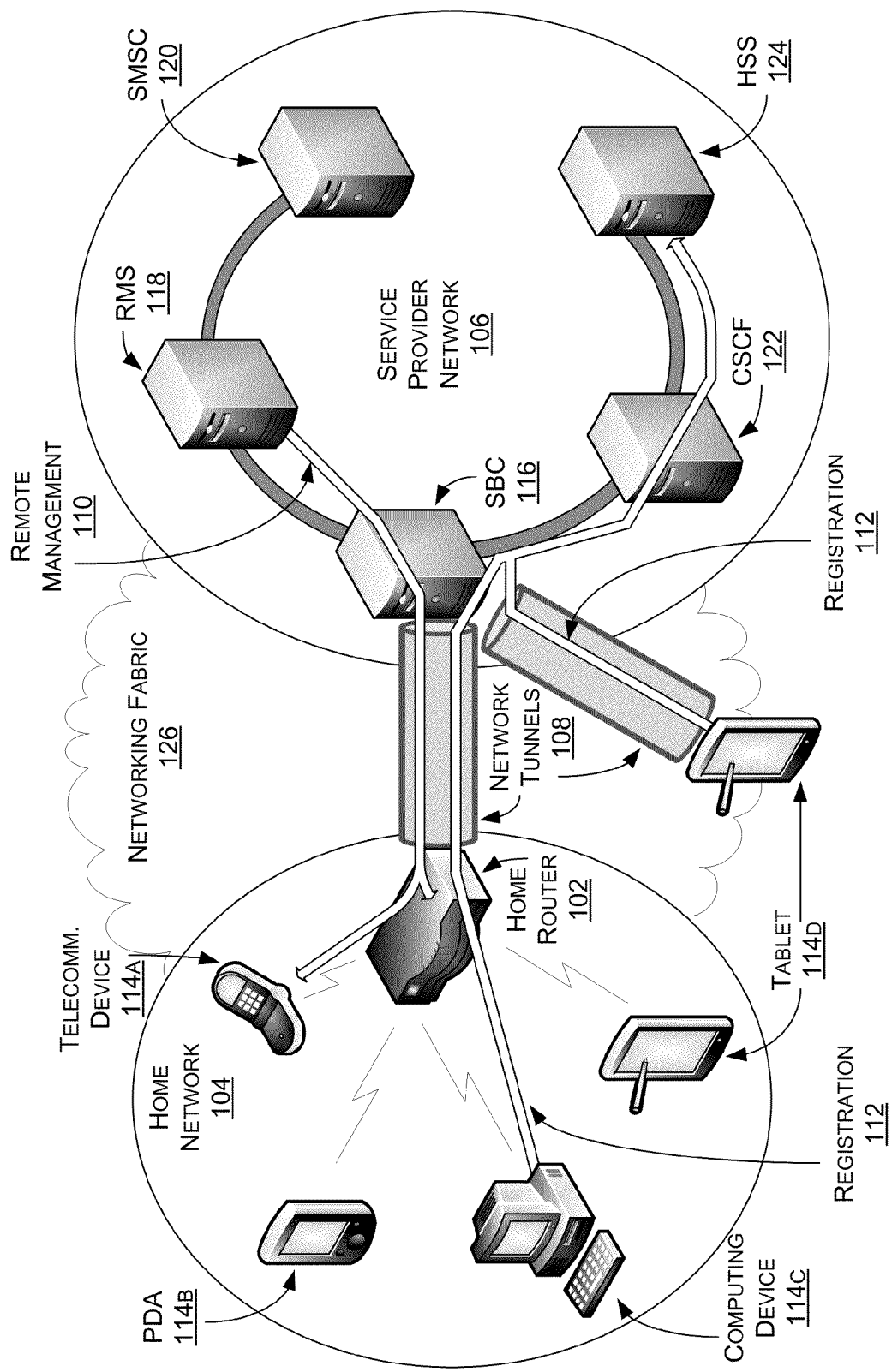
FIG. 1 illustrates an overview of secured communications between devices of home and service provider networks, in accordance with various embodiments.

FIG. 1 illustrates an overview of secured communications between devices of home and service provider networks, in accordance with various embodiments. As shown in FIG. 1, a home router 102 of a home network 104 is securely connected to a service provider network 106 via a network tunnel 108. Devices of the home network 104 and service provider network 106 utilize the network tunnel 108 for remote management 110 and registration 112 of devices of the home network 104. In various embodiments, the devices of the home network 104 include the home router 102 and other devices such as telecommunication devices 114a, personal digital assistants (PDAs) 114b, personal computers (PCs) 114c, and tablet computers 114d, collectively referred to as "devices 114". The service provider network 106 may include an IMS network having a session border controller (SBC) 116, a remote management server (RMS) 118, a short message service center (SMSC) 120, a call session control function device (CSCF) 122, and a home subscriber server (HSS) 124. In some embodiments, the home network 104 and service provider network 106 are private networks connected by a networking fabric 126.

In various embodiments, the home router 102 serves as a gateway to the service provider network 106 for other devices 114 of the home network 104. The home router 102 is configured to establish the network tunnel 108 with a device of the service provider network 106 to secure communications between the home network 104 and service provider network 106 and to reestablish the network tunnel 108 when secure communication fails. Also, the home router 102 is configured to receive remote management 110 from the service provider network 106, to enable remote management 110 of a device 114 of the home network 104, and to act as a registrar for devices 114 of the home network 104, providing registration requests to the service provider network 106 on behalf of devices 114 of the home network 104. In some embodiments, the home router 102 enables voice and data communications between the devices 114 of the home network 104 and the service provider network 106. For example, the home router 102 may serve as a gateway for phone calls, electronic messages such as email, SMS, and MMS messages, and web browsing. An example home router 102 is illustrated in greater detail in FIG. 8 and is described in detail below with reference to that figure.

The home network, as illustrated in FIG. 1, includes a plurality of devices 114 communicatively coupled via a home router 102. In some embodiments, the home network 104 comprises a private network between these devices 114, such as a Wide-Area Network (WAN), a local area network (LAN) or personal area network (PAN). Communications between the devices 114 of the home network 104 may be wired, wireless, or both. For example, a PC 114c may be connected to the home router 102 via an Ethernet cable and a tablet computer 114d may be connected to the home router 102 via a Wi-Fi connection—or some other wireless connection, such as a Wi-Max or DECT connection. Also, communications between the devices 114 of the home network 104 utilize any sort of communication protocol known in the art for sending and receiving messages, such as the Transmission Control Protocol/Internet Protocol (TCP/IP), the Hypertext Transfer Protocol (HTTP), Extensible Messaging and Presence Protocol (XMPP), and/or the Session Initiation Protocol (SIP). In one embodiment, communications conform to SIP for later transmission by the home router 102 to the service provider network 106 and also conform to TCP/IP and/or HTTP for transmission across the home network 104. In some embodiments, the home network 104 is associated with a geographic location, such as a residence of a subscriber to the service provider network 106. In such embodiments, the home router 102 is located at the geographic location and the other devices 114 of the home network 104 may also be located at the geographic location or may roam away from the location and, thus, outside of the home network 104. FIG. 1, for instance, shows a tablet computer 114d both within the home network 104 when at the geographic location of the home network 104 and outside of the home network 104 when away from the geographic location.

As mentioned above, the home router 102 servers as a router and gateway for the communications of the home network 104, receiving communications over home network 104 from the other devices 114 of the home network 104 and providing communications over the home network 104 to the other devices. As also mentioned above, the devices of the home network 104 include computing systems such as a telecommunication device 114a, a PDA 114b, a PC 114c, and a tablet computer 114d. Each of these devices 114 is configured to be remotely managed 110 and/or to register 112 with the service provider network 106. In some embodiments, the devices 114 are also configured to establish a secure connection via a network tunnel 108 with the service provider network 106 when the devices 114 are outside of the home network 104 and to reestablish the secured connection when the secured connection fails. In further embodiments, the home network 104 includes other devices besides those shown. Such other devices could include at least one of a workstation, a server system, a television, a media player, a digital video recorder, a game device, a set-top box, or a camera. An example device 114 is illustrated in greater detail in FIG. 9 and is described in detail below with reference to that figure.

Also, in addition to the home router 102 and devices 114, the home network 104 may include a modem or other computing device that provides connectivity to the networking fabric 126 and, through networking fabric 126, to the service provider network 106. Thus, the modem would serve as a first gateway and could provide networking fabric access to the home router and one or more other devices. In such embodiments, the home router 102 would be a second gateway providing connectivity for devices 114 connecting to the service provider network 106 through the home router 102 and the modem. Also in such embodiments, both the modem and the home router 102 are each assigned a public Internet Protocol (IP) address.

In various embodiments, the service provider network 106 is associated with a service provider, such as a provider of telecommunication services, data services, messaging services, etc. The service provider network 106 is a private network of that service provider and includes any one or more networks known in the art, such as cellular networks and/or data networks, including wide area networks (WANs), local area networks (LANs), personal area networks (PANs), and/or the Internet. Communications between the devices of the service provider network 106 utilize any sort of communication protocol known in the art for sending and receiving messages, such as TCP/IP, HTTP, and/or SIP. The devices of the service provider network 106 are also connected to each other via wired and/or wireless connections, such as through Ethernet and Wi-Fi connections. Also, the service provider network 106 may be associated with a single geographic location or with a number of dispersed geographic locations. Because the devices of the service provider network 106 may be remote from each other geographically, communications between the devices may be secured by VPNs and network tunnels (not shown) or by point-to-point connections.

As shown in FIG. 1, the service provider network 106 includes a plurality of devices 116-124. All or some of these devices 116-124 in turn comprise an IMS network of the service provider network 106. As mentioned above, an IMS network provides a framework for multimedia voice and data communications, replacing mobile networks such as the Global System for Mobile Communications (GSM). IMS networks rely on data networks such as the Internet and utilize Internet standard protocols, such as SIP, TCP/IP, HTTP, etc.

In various embodiments, the IMS network includes SBC 116. SBC 116 is further configured to act as a VPN server to provide a secure connection between the home network 104 and the service provider network 106. In some embodiments, the SBC 116 sits at the edge of the border of the service provider network 106 and the networking fabric 126 and controls the flow of data and signaling between the networking fabric 126 and the service provider network 106.

The IMS network also includes CSCF 122. CSCF 122 comprises one or more SIP servers or proxies and processes and routes SIP packets for the IMS network. In one embodiment, CSCF 122 includes at least one of a proxy CSCF, which serves as a SIP proxy and which is integrated in the SBC 116, an interrogating CSCF, which routes SIP requests to a serving CSCF assigned to a system that sent the SIP requests, and a serving CSCF, which interfaces with an HSS of the IMS network and handles SIP registrations.

Figure 5:
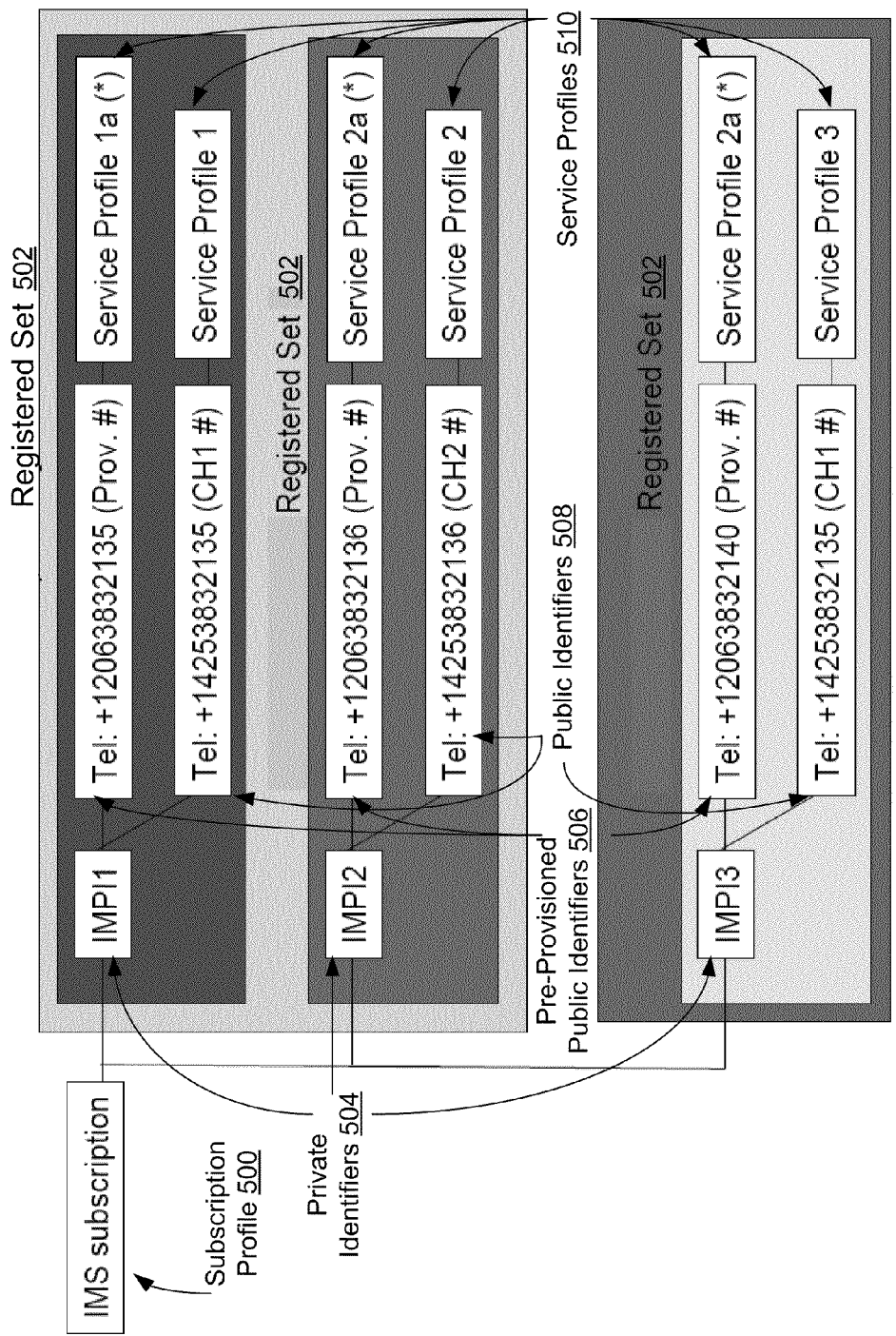
FIG. 5 illustrates a subscription profile utilized in registering a device of the home network, in accordance with various embodiments.

In some embodiments, the IMS network also includes HSS 124. HSS 124 is a master user database that stores subscriber-related information (subscriber profiles) and is configured to work with a serving CSCF 122 to perform the registering 112 of devices of the home network 104. The HSS also performs authentication and authorization of the user, and can provide information about the subscriber's location and IP information. To this end, the HSS 124 is provisioned with subscriber profiles comprising one or more registration sets for each device of the home network 104. These registration sets are illustrated in FIG. 5 and described in greater detail below with reference to that figure. In some embodiments, the HSS 124 is also called a User Profile Server Function (UPSF). As used herein, HSS 124 refers to an HSS, a User Profile Server Function, or a database containing the subscription-related information.

In addition to the SBC 116, the CSCF 122, and the HSS 124, the IMS network may include one or both of the RMS 118 or the SMSC 120. In other embodiments, the RMS 118 and SMSC 120 belong to the service provider network 106 but do not form a part of the IMS network of the service provider network 106. The RMS 118 is configured to remotely manage 110 the home router 102 and/or other devices of the home network 104 and may include a proxy VPN server to establish the network tunnel 108. The RMS 118 also provides a graphic user interface (GUI) to an administrative user of the service provider network 106 or communicates with another server device to enable that device to provide a GUI. Also, either the RMS 118 or the other server device may provide a web GUI accessible by a user of the home network 104 to, for example, request service or some other type of remote management 110. The RMS 118 may also be configured to trigger the SMSC 120 to send an SMS to the home router 102 to cause the home router 102 to initiate a secure connection with the service provider network 106. And the SMSC 120 is complementarily configured to receive a command from the RMS 118 to send an SMS to the home router 102 and to send, in response to that command, an SMS to the home router 102.

In various embodiments, the devices 116-124 may be implemented in any sort of computer system, such as a personal computer (PC), a laptop computer, a workstation, a server system, a mainframe, or a server farm. An example device 116-124 is illustrated in greater detail in FIG. 10 and is described in detail below with reference to that figure.

In addition to the devices 116-124 shown in FIG. 1, the service provider network 106 may also include one or more other devices, such as a voicemail server, a border gateway, an Internet messaging platform, a multimedia telephony application server, a presence server, a media resource function, a multimedia message service center, a content server, or a home location register. Each of these devices performs the function(s) for which it is known in the art.

In various embodiments, the network tunnels 108 shown in FIG. 1 between the SBC 116 and the home router 102 and between the SBC 116 and the tablet computer 114d represent secure communication channels, such as those associated with VPNs. While the device 114 of the home network 104 having its own network tunnel 108 with the service provider network 106 is shown as the tablet computer 114d, any of the devices 114 of home network 104 can establish a network tunnel 108 when traveling away from a geographic location associated with the home network 104. Various techniques for establishing and reestablishing the network tunnels 108 are shown in FIGS. 2, 3a, 3b, and 6 and are described in greater detail below with reference to those figures. Packets transmitted across the network tunnels are encrypted according to the IPSec protocol suite by a VPN client of the home router 102 or of a device 114 of the home network 104 and the network tunnels 108 are thus considered IPSec tunnels. In other embodiments, Secure Socket Layer (SSL) or Transport Layer Security (TLS) may be used in place of or in addition to the IPSec protocol In some embodiments, the networking fabric 126 represents any one or more networks known in the art, such as cellular networks and/or data networks, including wide area networks (WANs), LANs, PANs, and/or the Internet. A connection between the home network 104 and the service provider network 106 may be through a number of routers, base stations, and/or devices acting as bridges between cellular and data networks. Communications between the home network 104 and the service provider network 106 utilize any sort of communication protocol known in the art for sending and receiving messages, such as TCP/IP and/or HTTP. In some embodiments, network fabric 126 also includes an Internet service provider (ISP) providing Internet connectivity to the home network 104.

Figure 2:
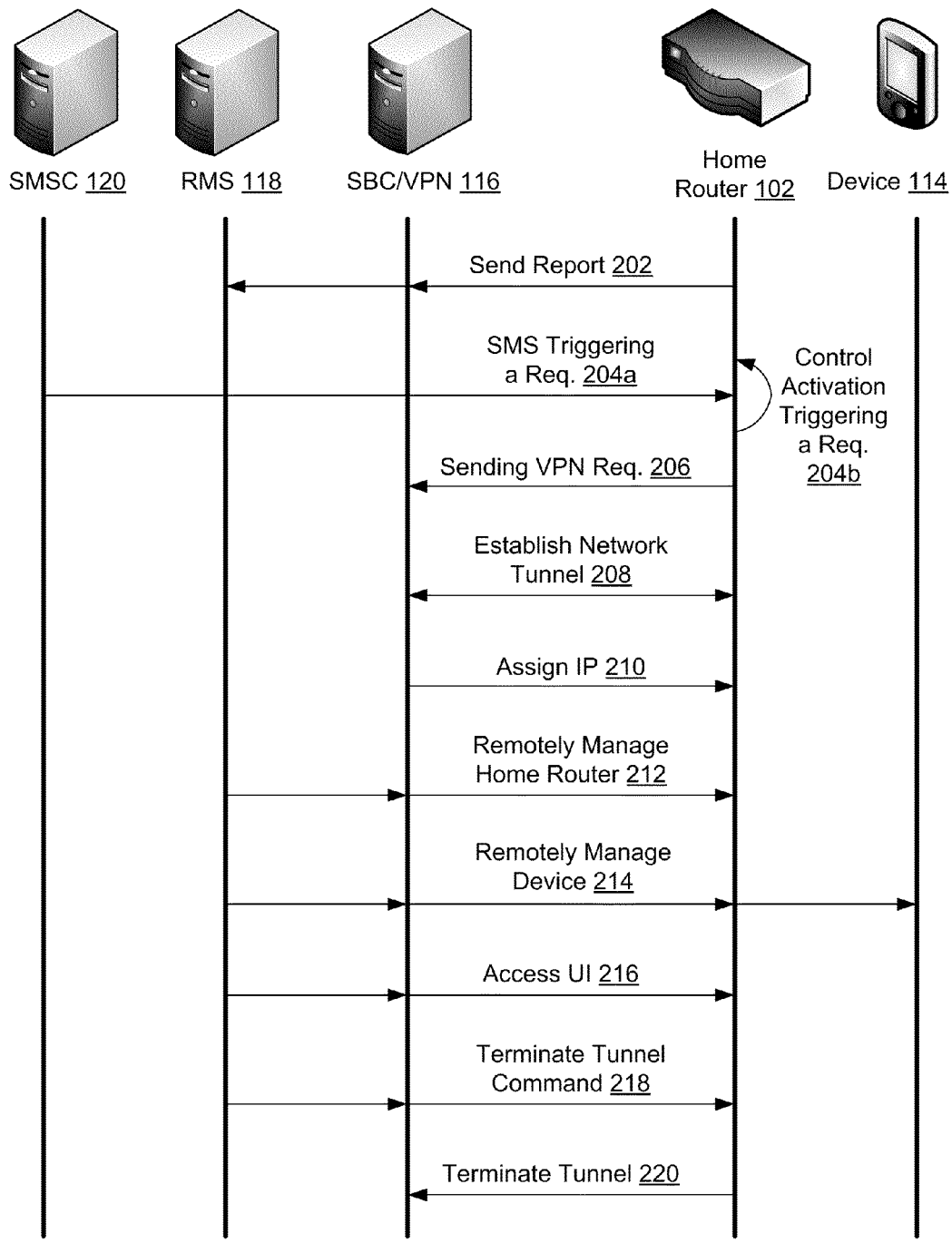
FIG. 2 illustrates an interaction diagram of the remote management of home network devices, in accordance with various embodiments.

In various embodiments, the remote management 110 shown in FIG. 1 comprises the remote management of the home router 102 and one or more devices 114 by the RMS 118. The remote management 110 includes at least one of repairing, maintaining, updating, configuring, provisioning, or analytics. The details of the remote management 110 are illustrated in FIG. 2 and are described below in greater detail with reference to that figure.

Figure 3A:
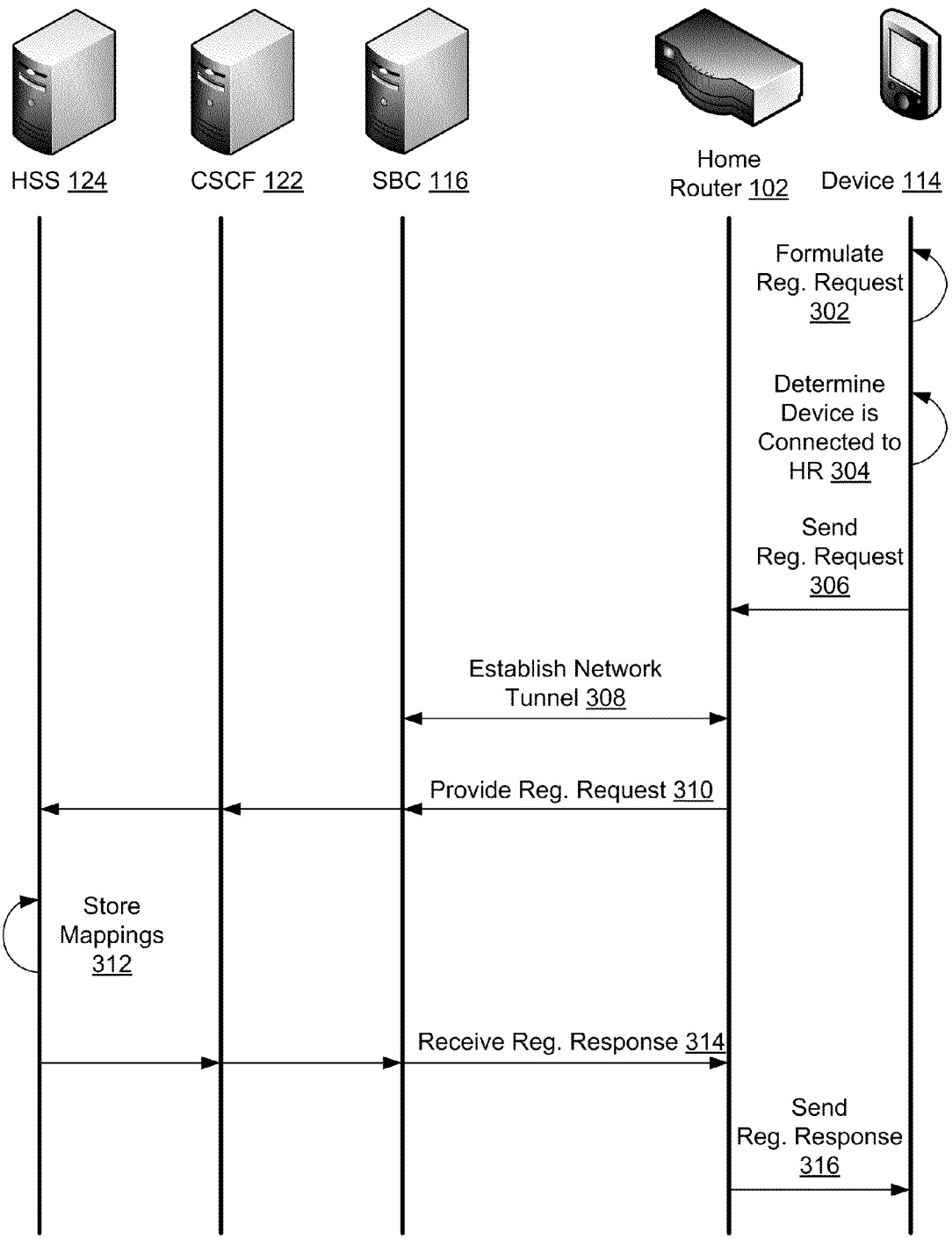
FIGS. 3a and 3b illustrate interaction diagrams of the secured registration of a home network device with the service provider network, in accordance with various embodiments.
Figure 3B:
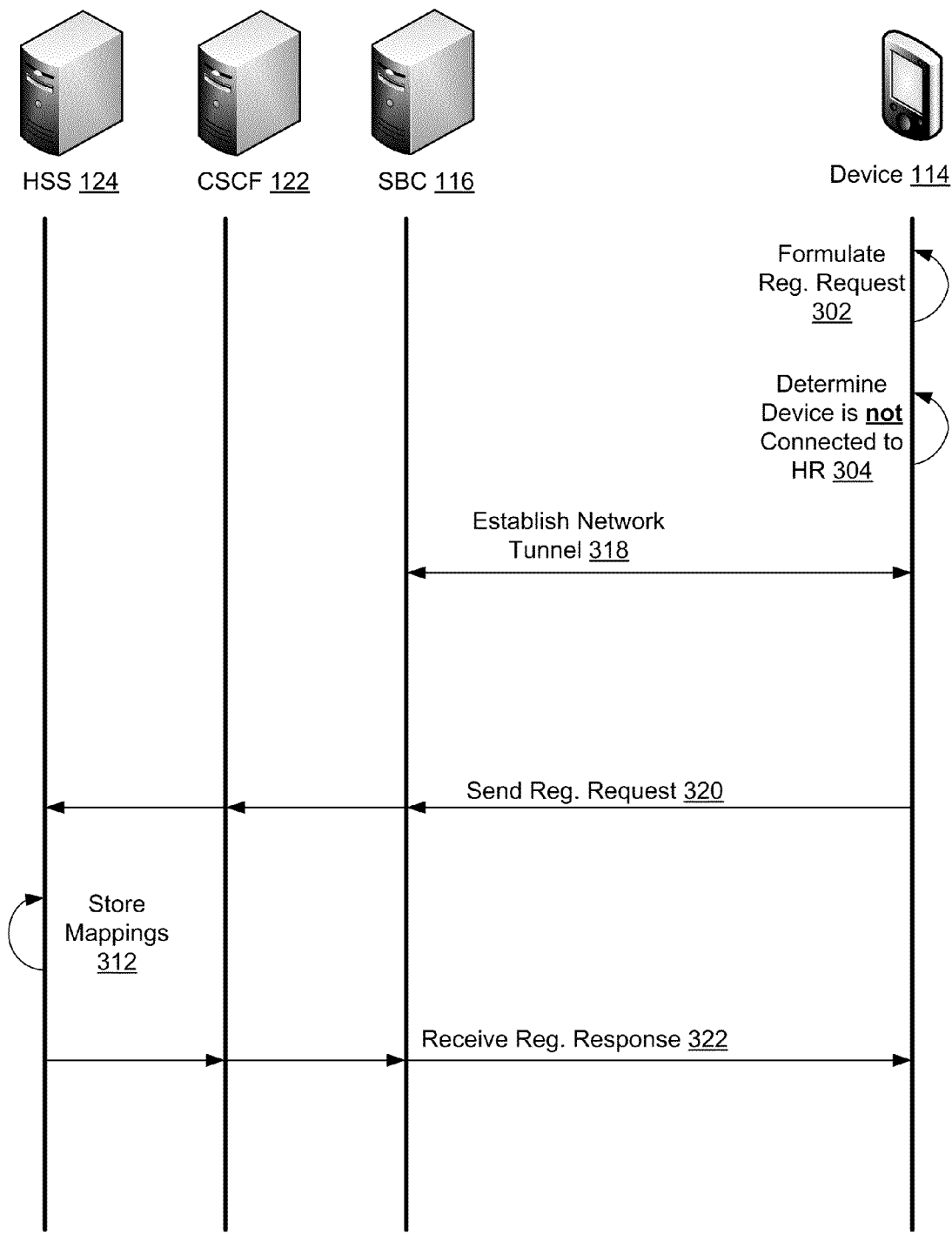

The registration 112 shown in FIG. 1 comprises the registration of one or more of the devices 114 and/or the home router 102 with the service provider network 106. The registration 112 includes providing a pre-provisioned public identifier and receiving a public identifier useable in communications in response. Also, in performing the registering 112, the home router 102 may act as a registrar for other devices 114, and the devices 114 may either register themselves or register through the home router 102 depending on whether they are located within the home network 104. The details of the registration 112 process are illustrated in FIGS. 3a and 3b and are described below in greater detail with reference to those figures.

Figure 6:
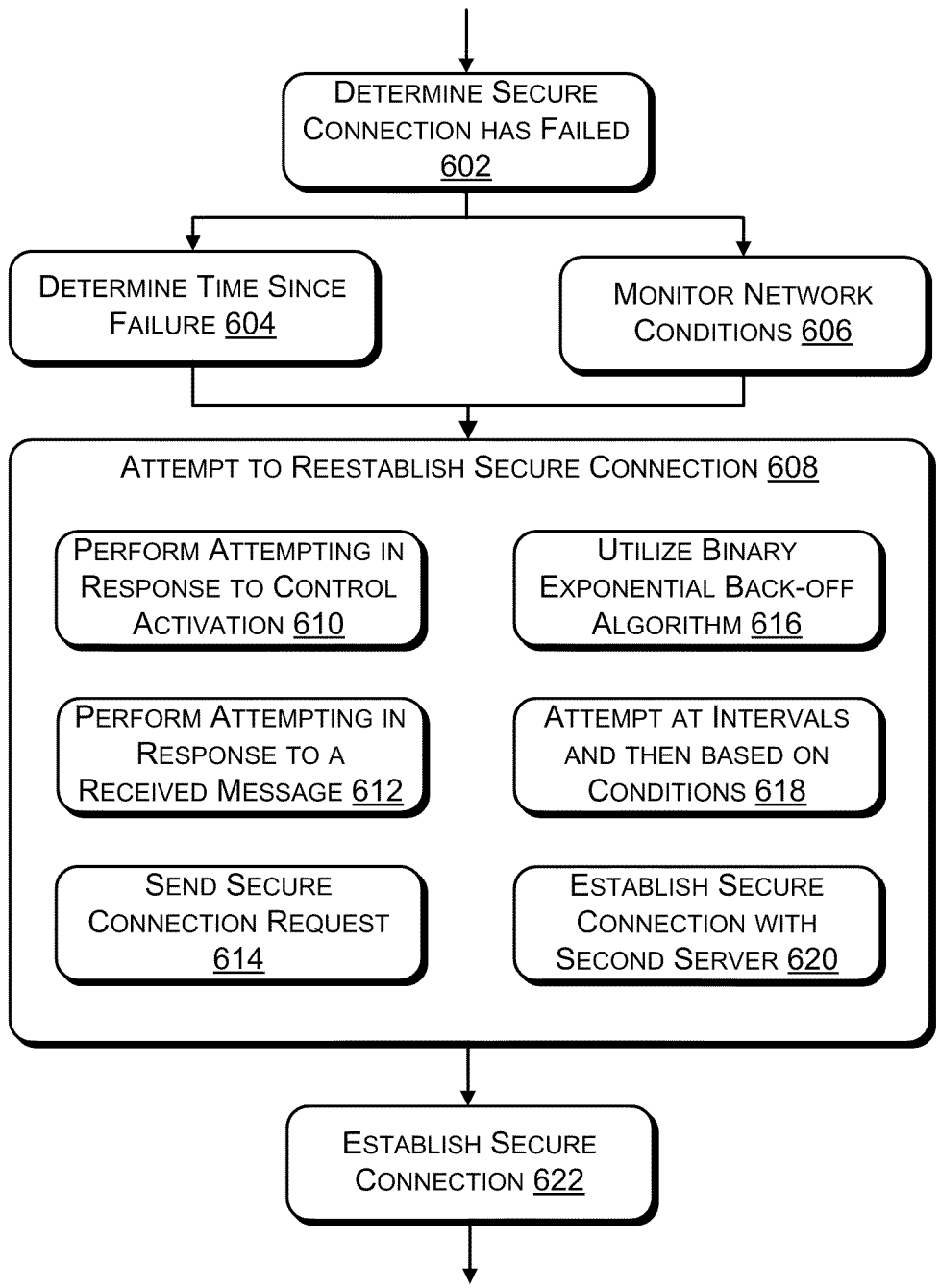
FIG. 6 illustrates a flowchart showing a method of attempting to reestablish a secure connection between a home router of the home network and the service provider network, in accordance with various embodiments.

Also, in some embodiments, an endpoint of one of the network tunnels 108 is configured to attempt, in response to determining that the network tunnel 108 has failed, to reestablish the network tunnel 108. The reestablishing of a network tunnel 108 is illustrated in FIG. 6 and is described below in greater detail with reference to that figure.

Remote Management

FIG. 2 illustrates an interaction diagram of the remote management of home network devices, in accordance with various embodiments. The figure includes representations of the home router 102, a device 114, the SBC 116, the RMS 118, and the SMSC 120, each representation including a graphic depiction and a vertical line descending across the figure. Between these vertical lines are horizontal lines terminating in arrows representing interactions between ones of the home router 102, a device 114, the SBC 116, the RMS 118, and the SMSC 120. Each horizontal line represents a single interaction or a group of interactions. When one of the horizontal lines crosses a vertical line without terminating at an arrow, this indicates that the system associated with the crossed line is not involved in the interaction. When one of the horizontal lines crosses a vertical line, terminates at an arrow, and then resumes, this indicates that the system associated with the crossed line is involved in the interaction. For example, if a horizontal line extends between a first vertical line and a third vertical line, crosses a second vertical line, and terminates with arrows at each of the second and third vertical lines, this indicates that devices associated with each of the first, second, and third vertical lines are involved in the interaction.

In various embodiments, the interactions shown in FIG. 2 are example interactions associated with the remote management 110 of the home router 102 and the device 114. As mentioned above, remote management 110 enables a device of the service provider network 106, such as the RMS 118, to provide repair, maintenance, configuration, and other services to devices of the home network 104 via a network tunnel 108 between the home network 104 and service provider network 106.

In various embodiments, the remote management 110 is responsive to status reports or schemas provided 202 by the home router 102 to, for example, the RMS 118. As illustrated, the home router 102 provides 202 the status report or schema to the RMS 118 through the SBC 116, which provides the home router 102 with connectivity to the service provider network 106. The status report includes performance metrics associated with the home router 102, with devices 114, and with other aspects of the home network 104. The schema includes information associated with configurations and versions of various modules and processes of the home router 102 and devices 114. The status reports and schemas may be created on a pre-determined basis, such as every n time units by module(s) of the home router 102 and/or devices 114. Also or instead, the module(s) of the home router 102 and/or devices 114 can create the status reports or schemas in response to the occurrence of an event, such as a configuration change or performance exceeding a threshold.

In some embodiments, when the RMS 118 receives a status report or schema, the RMS 118 stores that status report or schema. Also, the RMS 118 evaluates the received status report or schema to determine whether or not to perform remote management 110 of the home router 102 or devices 114. For example, if the schema indicates that the home router 102 has version A of a software patch and the service provider now requires version B, the RMS 118 would trigger remote management 110 of the home router 102. Thus, RMS 118 utilizes one or more factors such as specifications of current configurations or versions or performance thresholds to determine whether or not to initiate remote management 110 of the home router 102 and/or devices 114 in response to the provided 202 status report or schema.

To trigger remote management 110, the RMS 118 instructs the SMSC 120 to send 204a an SMS to the home router 102 to trigger the home router 102 to request a secure connection, such as a VPN. The RMS 118 may instruct the SMSC 120 in response to a status report or schema, as discussed above, or in response to an entry or selection made by an administrative user of the service provider network 106. For example, a user of a home network 104 may call the service provider of the service provider network 106 to complain about a problem with the home router 102 or a device 114, such as slow performance, or in regards to setting up the home router 102 or a device 114. The call is then connected to an administrative user of the service provider network 106, such as a customer care representative or the like. The administrative user then enters or selects a command which causes the SMSC 120 to send 204a an SMS to the home router 102. In one embodiment, the command is selected or entered via a GUI associated with the RMS 118 or with another device of the service provider network 106.

Upon receiving a command to send 204a an SMS, whether in response to a status report or schema or in response to input received from an administrative user, the SMSC 120 formulates an SMS and sends 204a the SMS to the home router 102. In some embodiments, the SMS is not sent through the RMS 118 or SBC 116, but rather is communicated directly across the networking fabric 126. In other embodiments (not shown), one or both of the RMS 118 or SBC 116 is involved in the transmission of the SMS. The SMS sent 204a includes at least a command instructing the home router 102 to request a VPN. In addition to this command, the SMS may include additional information, such as information including an address or locator of the RMS 118 or SBC 116, a time at which to request the VPN, and retry behavior for utilization in the event that the VPN fails.

In various embodiments, as shown by FIG. 2, the VPN request is triggered by activation 204b of a control of the home router 102 rather than in response to an SMS being sent 204a. As described further herein, the home router 102 is equipped with one or more controls, such as physical push buttons or soft keys of a touch-sensitive graphic user interface. In one embodiment, the physical push button is a dedicated key for triggering a VPN request. A user of the home router 102 activates 204b the control by touching or pressing on the control, the touching or pressing of the control signaling module(s) within the home router 102 to formulate and transmit a VPN request. A user of the home router 102 might activate the control in response to a performance issue, such as slow operation, or to request help setting up or configuring the home network 104

While triggering of a VPN request is shown in FIG. 2 as resulting from the sending 204a of an SMS or from the activation 204b of a control, any other number of mechanisms known in the art for triggering a VPN request may also be practiced by the home router 102. For example, the SMS may be sent 204a in response to the interaction of a user of the home network or an administrative user of the service provider with a GUI offered by a web page.

In various embodiments, the home router 102 sends 206 a VPN request in response to being triggered to do so. As illustrated in FIG. 2, the secure connection request is transmitted to the SBC 116, which implements a VPN server for establishing secure connections, such as network tunnel 108. In other embodiments (not shown), the VPN request is relayed to the RMS 118 or another device implementing a VPN server or proxy VPN server. To send 206 the VPN request, the home router 102 first determines an address or locator of a device to send 206 the request to, such as an address or locator of the SBC 116. The home router 102 may determine the address by examining an SMS, if received, or by retrieving and address or locator that has previously been provided to the home router 102. In some embodiments, the address is an IP address and is hard coded on the home router 102 or provided with an update. Also, in some embodiments, the VPN request specifies an IP address and port number of the home router 102 or an IP address of a modem to which the home router 102 is connected and a port number on which the home router 102 is listening. In various embodiments, the operations utilized to formulate and send 206 the VPN request are performed by a VPN client of the home router 102.

In some embodiments, the home router 102 may be connected to the networking fabric 126 and reachable via that networking fabric 126. As mentioned above, the home router 102 may be connected via a modem which serves as a gateway to the networking fabric 126 for the home router 102. In such a situation, the modem may implement port forwarding to enable connectivity to the home router 102. Or if the modem does not implement port forwarding, the home router 102 may at least be associated with a public IP address, such as an IP address assigned by an ISP. In one embodiment, the modem is a Network Address Translation (NAT) gateway which assigns private IP addresses to the home router 102 and devices 114.

In another embodiment, the modem is a Network Address Translation/Protocol Translation which translates IPv4 to IPv6 (and vice versa) or acts as a DHCP server.

Also, as mentioned above, the packets communicated across the secure connection, which may be a network tunnel 108 of a VPN, are encrypted according to the IPSec protocol suite. Further, each packet to be communicated is encapsulated inside another packet. The header of this other packet used for encapsulating may be modified as the packet crosses different networks, but the payload and header of the encapsulated packet are not modified. Additionally, if the home router 102 is accessed through a NAT gateway, the encapsulated packet is again encapsulated in a further packet, the further packet being a User Datagram Protocol (UDP) packet for NAT traversal.

Once the SBC 116 receives the VPN request, the SBC 116 establishes 208 the network tunnel 108. In various embodiments, in establishing 208 the network tunnel 108, the SBC 116 assigns 210 an IP address, such as a private IP address, to the home router 102 for use in secure communication between the SBC 116 and home router 102. That IP address is then used for communications across the network tunnel 108. The SBC 116 and home router 102 may each also perform a number of other operations to establish 208 the network tunnel 108. Operations used to establish a network tunnel 108 are known to those skilled in the art and thus need not be described further.

Once the network tunnel 108 between the SBC 116 and home router 102 has been established, the RMS 118 utilizes the network tunnel 108 to remotely manage 110 the home network 104. Remotely managing 110 the home network 104 includes any or all of remotely managing 212 the home router 102, remotely managing 214 a device 114, or accessing 216 a UI, such as a GUI, of the home router 102 or of a device 114. As shown in FIG. 2, the remote management 212 and 214 and access 216 are transmitted through the SBC 116 and the network tunnel 108. Also, the remote management 214 of the device 114 is further transmitted through the home router 102 and across the home network 104. In some embodiments, the remote management 212 and 214 and access 216 are transmitted in the form of commands and/or data.

In some embodiments, the RMS 118 is notified of the establishment 208 of the network tunnel 108 by either the SBC 116 or the home router 102. Or, in other embodiments, the RMS 118 discovers by monitoring that a network tunnel 108 has been established 208.

In various embodiments, whether the RMS 118 remotely manages 212 the home router 102, remotely manages 214 a device 114, or both depends on the reason for triggering the network tunnel 108. For example, if the home router 102 sent 202 a schema indicating versions of a software module on the home router 102 and on a device 114 that are out of date, the RMS 118 may have triggered 204a the initiating of the network tunnel 108 to provide the home router 102 and device 114 with updated versions of the software module. In such an example, the RMS 118 remotely manages 212 the home router 102 by transmitting the updated software module to the home router 102, installing the updated software module, and verifying that the home router 102 functions properly with the updated software module installed. The RMS 118 also remotely manages 214 a device 114 by transmitting the updated software module to the device 114, installing the updated software module, and verifying that the device 114 functions properly with the updated software module installed.

In another example, the home router 102 is not functioning properly and its user calls a customer care representative of the service provider. That representative, who acts as the above-described administrative user, instructs the user to push a button or actuate a soft key to trigger initiation of a network tunnel 108. The representative then interacts with the RMS 118 to remotely manage 212 the home router 102, the remote management 212 including investigating potential causes of the improper functioning To enable investigating, the home router 102 may include a module which performs diagnostic tests and provides access to system settings and metrics to RMS 118. In response to the investigating, the RMS 118 might, for example, update home router 102 settings, modify settings of a firewall associated with the home router 102, or download and install a software patch.

In some embodiments, the investigating includes accessing 216 a UI of the home router 102 or device 114, such as a GUI. The UI may convey an error message, for example, and the RMS 118 may access 216 the UI to review the error message. In various embodiments, the RMS 118 may access 216 the UI for other reasons. For example, the user may be attempting to set up the home router 102 for use the first time. In such circumstances, the representative of the service provider utilizes the RMS 118 to access 216 the UI to walk the user through the set up.

In addition to the examples of remote management 110 provided above, the remote management 110 includes at least one of repairing, maintaining, updating, configuring, provisioning, or analytics. The repairing, maintaining, updating, configuring, provisioning, or analytics may comprise the remote management 212 of the home router 102, the remote management of a device 114, or both.

In various embodiments, upon completion of remote management 110, the RMS 118 sends 218 a command to terminate the network tunnel 108. The request is sent to the home router 102 through the SBC 116 and network tunnel 108. The command may be manually initiated by the service provider or automatically initiated in response to an event, such as the occurrence of a pre-determined idle time.

Upon receiving the command to terminate the network tunnel 108, the home router terminates 220 the network tunnel 108. In other embodiments, the home router 102 terminates the network tunnel 108 without receiving any sort of command to do so. For example, the home router 102 may also monitor for events such as the occurrence of a pre-determined idle time and, in response to detecting the occurrence of the event, may terminate 220 the network tunnel 108. Registration FIGS. 3a and 3b illustrate interaction diagrams of the secured registration of a home network device with the service provider network, in accordance with various embodiments. FIG. 3a includes representations of the home router 102, a device 114, the SBC 116, the CSCF 122, and the HSS 124, each representation including a graphic depiction and a vertical line descending across the figure. FIG. 3b includes representations of a device 114, the SBC 116, the CSCF 122, and the HSS 124, each representation including a graphic depiction and a vertical line descending across the figure. Between these vertical lines are horizontal lines terminating in arrows representing interactions between ones of the home router 102, a device 114, the SBC 116, the CSCF 122, and the HSS 124. Each horizontal line represents a single interaction or a group of interactions. When one of the horizontal lines crosses a vertical line without terminating at an arrow, this indicates that the system associated with the crossed line is not involved in the interaction. When one of the horizontal lines crosses a vertical line, terminates at an arrow, and then resumes, this indicates that the system associated with the crossed line is involved in the interaction. For example, if a horizontal line extends between a first vertical line and a third vertical line, crosses a second vertical line, and terminates with arrows at each of the second and third vertical lines, this indicates that devices associated with each of the first, second, and third vertical lines are involved in the interaction.

In various embodiments, a device 114 of a home network 104 registers 112 itself with the service provider network 106 through a series of interactions illustrated in FIGS. 3a-3b. The device 114 registers 112 itself the first time that the device 114 is used. The device 114 may also register itself on subsequent occasions, such as when initiating a communication such as a phone call or electronic message. In some embodiments, the device 114 initiates the registering 112 automatically, without any interaction with a device user. In other embodiments, the user must take some action, such as pushing a button or entering a key sequence, to cause the device 114 to register 112 itself.

As shown in FIGS. 3a and 3b, once the device 114 determines to register 112 itself, the device 114 formulates 302 a network registration request. In some embodiments, the network registration request is formulated 302 as a SIP register request by a SIP client of the device 114. In other embodiments, the device 114 is not equipped with a SIP client and formulates 302 the request in some other form. Other forms can include text, Extensible Markup Language (XML), etc.

The network registration request comprises a registration set containing at least one of a globally unique private device identifier and a pre-provisioned public identifier. In some embodiments, the private identifier and/or pre-provisioned public identifier are stored in memory of the device 114. In other embodiments, the private identifier and/or pre-provisioned public identifier is obtained from another device, such as home router 102. Either of the private identifier or the pre-provisioned public identifier may be one of a telephone number, an IP address, or a messaging identifier. In one embodiment, the private identifier may be an IP Multimedia Private Identity (IMPI) and the pre-provisioned public identifier may be an IP Multimedia Public Identity (IMPU) for use in an IMS network of the service provider. In some embodiments, the pre-provisioned public identifier is only used for registering 112 the device 114, and the device 114 receives another public identifier for use in voice and data communication in response to the registering 112. In such embodiments, the pre-provisioned public identifier is not useable in voice and data communications. The other public identifier may also be an IMPU and may be one of a telephone number, an IP address, or a messaging identifier.

In various embodiments, once the device 114 has formulated 302 the network registration request, the device 114 determines 304 whether it is connected to the home router 102 and thus to the home network 104. The device 114 is equipped with module(s) for performing the determining 304. Such module(s) may examine existing connections of the device 114 and/or may attempt to ping or otherwise contact the home router 102 to determine whether the home router 102 is reachable. If the home router 102 is reachable, but the device 114 is not connected to the home router, the device 114 establishes a connection with the home router 102, such as a LAN or PAN connection. In some embodiments, the device 114 utilizes a wireless interface, such as a Wi-Fi, Bluetooth, Wi-Max, or DECT interface to contact and connect to the home router 102. FIG. 3a illustrates further interactions in response to the device 114 determining 304 that the device 114 is connected to the home router 102. FIG. 3b illustrates further interaction in response to the device 114 determining that the device 114 is not connected to the home router 102.

As shown in FIG. 3a, if the device 114 determines 304 that the device 114 is connected to the home router 102, the device 114 sends 306 the network registration request to the home router 102. The device 114 sends 306 the network registration request via the LAN or PAN comprising the home network 104 and connecting the device 114 to the home router 102. Once the home router 102 receives the network registration request, it determines whether the network registration request is a SIP register request. If it is not a SIP register request, the home router transforms the network registration request into a SIP register request using an Internetworking block of the home router 102. An example Internetworking block is illustrated in FIG. 4 and described below in greater detail with reference to that figure.

In various embodiments, the home router 102 next establishes 308 a secure connection, such as a network tunnel 108 of a VPN, in response to receiving the network registration request from the device 114. To establish 308 the network tunnel 108, the home router 102 first sends a secure connection request, such as a VPN request, to the SBC 116 of the service provider network 106. To send the VPN request, the home router 102 first determines an address or locator of a device to send the request to, such as an address or locator of the SBC 116. The home router 102 may determine the address by retrieving an address or locator that has previously been provided to the home router 102. In some embodiments, the address is an IP address and is hard coded on the home router 102 or provided with an update. Also, in some embodiments, the VPN request specifies an IP address and port number of the home router 102 or an IP address of a modem to which the home router 102 is connected and a port number on which the home router 102 is listening. In various embodiments, the operations utilized to formulate and send the VPN request are performed by a VPN client of the home router 102.

In some embodiments the home router 102 may be connected to the networking fabric 126 and reachable via that networking fabric 126. As mentioned above, the home router 102 may be connected via a modem which serves as a gateway to the networking fabric 126 for the home router 102. In such a situation, the modem may implement port forwarding to enable connectivity to the home router 102. Or if the modem does not implement port forwarding, the home router 102 may at least be associated with a public IP address, such as an IP address assigned by an ISP. In one embodiment, the modem is a Network Address Translation (NAT) gateway which assigns IP addresses, such as private IP addresses, to the home router 102 and devices 114.

Also, as mentioned above, the packets communicated across the network tunnel 108 are encrypted according to the IPSec protocol suite. Further, each packet to be communicated is encapsulated inside another packet. The header of this other packet used for encapsulating may be modified as the packet crosses different networks, but the payload and header of the encapsulated packet are not modified. Additionally, if the home router 102 is accessed through a NAT gateway, the encapsulated packet is again encapsulated in a further packet, the further packet being a User Datagram Protocol (UDP) packet for NAT traversal.

In various embodiments, in establishing 308 the network tunnel 108, the SBC 116 assigns an IP address, such as a private IP address to the home router 102 for use in secure communication between the SBC 116 and home router 102. That IP address is then used for communications across the network tunnel 108. The SBC 116 and home router 102 may each also perform a number of other operations to establish 308 the network tunnel 108. Operations used to establish a network tunnel 108 are known to those skilled in the art and thus need not be described further.

In other embodiments, not illustrated in FIG. 3a, the network tunnel 108 is established when the home router 102 is powered on or at some other time previous to receipt of the network registration request. In such embodiments, the network tunnel 108 is maintained while the home router 102 is powered on so that a secure connection for transmission of voice and data communications is available and does not have to be established anew each time a new communication is received.

As illustrated in FIG. 3a, the home router 102 provides 310 the network registration request of the device 114 to the HSS 124. The network registration request is sent via the network tunnel 108 to the SBC 116, from SBC 116 to the CSCF 122, and from the CSCF 122 to the HSS 124. As mentioned above, the service provider network 106 may include multiple HSSs and the CSCF 122 selects among these multiple HSSs. Also, in receiving the network registration request and providing 310 that request to the service provider network 106, the home router 102 acts as a registrar and back-to-back user agent (B2BUA). As B2BUA and registrar, the home router 102 implements a user agent server to receive the network registration request, convert the request to SIP if necessary, and store the request for later transmission if the service provider network 106 is unavailable. The home router 102 also implements a user agent client to make the network registration request on behalf of the device 114 by providing 310 the request and waiting for a response.

Once the network registration request is received by the HSS 124, the HSS 124 compares the registration set(s) of the network registration request to mappings stored 312 by the HSS 124. The storing 312 of the mappings, which is shown as occurring after the HSS 124 receives the network registration request and before the HSS 124 sends a response, can occur at any time. The mappings may have been stored 312, for example, in the HSS 124 at the time that the device 114 was purchased. A subscription to services offered by the service provider can be purchased at the same time as the device 114, and mappings which include a subscription profile corresponding to that subscription can be created and stored 312 when that subscription is purchased.

The mappings stored 312 by the HSS 124 include subscription profiles associated with a plurality of subscriptions for services offered by the service provider. Each subscription profile is in turn associated with one or more registration sets. Each registration set in turn includes one or more private identifiers, each private identifier being associated with a pre-provisioned public identifier and another public identifier for use in voice and data communications. Each public identifier is associated with a service profile. Further details of an example subscription plan are illustrated in FIG. 5 and described below in reference to that figure.

In some embodiments, the HSS 124 utilizes the pre-provisioned identifier and/or private identifier included in the network registration request to locate all matching registration sets that include that identifier or identifiers. Once those matching registration sets are located, the other public identifiers stored in those matching registration sets are noted as being registered, thereby allowing those other public identifiers to be used in voice or data communication. Noting a public identifier (and, thus, its associated device 114) as being registered may involve altering an HSS 124 setting or notifying another device or devices of the service provider network 106 that the public identifier is registered and ready for use.

Next, the HSS 124 sends a response to the network registration request to the home router 102, the response including the other public identifier(s) of the matching registration sets and the private identifier (if not included in the network registration request). The response is sent to the CSCF 122, from the CSCF 122 to the SBC 116, and from the SBC 116 to the home router 102 via the network tunnel 108. Once the home router 102 receives 314 the network registration response, the home router 102 determines which device 114 of the home network 104 to send the network registration response to. In some embodiments, the response includes an identification of the device 114. In other embodiments, the home router 102 stores records of the network registration requests and maps responses to those stored requests.

The home router 102 then sends 316 the network registration response to the device 114. The device 114 examines the received response to ascertain other public identifiers included in the response, and private identifiers(s) (if included in the response). The device 114 stores these other public identifiers and private identifiers in memory and then assigns device settings based on the other public identifiers. For example, one of the other public identifiers may be a phone number that the device 114 is to use in making and receiving calls. Upon ascertaining that phone number from the response, the device 114 sets an internal phone number setting to the received phone number.

As mentioned above, if the device 114 determines 304 that it is not connected to the home router 102 and that the home router 102 is unreachable, the device 114 will establish 318 a network tunnel 108 between itself and the SBC 116 and provide 320 the network registration request through that network tunnel 108. FIG. 3b illustrates such establishing 318 and providing 320.

In various embodiments, the device 114 determines 304 that the home router 102 is unreachable when the device 114 is away from a geographic location associated with the home network 104. Upon determining formulating 302 the network registration request and determining 304 that the device 114 is not connected to (or connectable to) the home router 102, the device 114 proceeds to establish a network tunnel 108 by sending a VPN request to the SBC 116. In such embodiments, the VPN request is transmitted over the networking fabric 126 or some other networking fabric. For example, the device 114 may be a cellular device and the networking fabric 126 may include a cellular network capable of transmitting the VPN request to the SBC 116.

To send the VPN request, the device 114 first determines an address or locator of the SBC 116. The device 114 may determine the address by retrieving an address or locator that has previously been provided to the device 114. In some embodiments, the address is an IP address and is hard coded on the device 114 or provided with an update. Also, in some embodiments, the VPN request specifies an IP address and port number of the device 114. In various embodiments, the operations utilized to formulate and send the VPN request are performed by a VPN client of the device 114.

Also, as mentioned above, the packets communicated across the network tunnel 108 are encrypted according to the IPSec protocol suite. Further, each packet to be communicated is encapsulated inside another packet. The header of this other packet used for encapsulating may be modified as the packet crosses different networks, but the payload and header of the encapsulated packet are not modified.

In various embodiments, in establishing 318 the network tunnel 108, the SBC 116 assigns an IP address, such as a private IP address, to the device 114 for use in secure communication between the SBC 116 and device 114. That IP address is then used for communications across the network tunnel 108. The SBC 116 and device 114 may each also perform a number of other operations to establish 308 the network tunnel 108.

Once the network tunnel 108 is established 318, the device 114 provides 320 the network registration request to the HSS 124 of the service provider network via the network tunnel 108, SBC 116, and CSCF 122 and receives 322, in response, a network registration response including a public identifier for use in voice and data communications. The providing 320 and receiving 322 performed by the device 114 is similar to the above described providing 306/310 and receiving 314/316, except that the home router 102 is bypassed and does not act as a registrar or B2BUA. Also, the storing 312 of mappings shown in FIG. 3b is performed in the same manner as the storing 312 shown in FIG. 3a. The result of these interactions, as described above in regard to FIG. 3a, is that the device 114 receives a public identifier and modifies internal settings based on the received public identifier.

In various embodiments, once the device 114 is registered 112, the device 114 utilizes the public identifier received through registering 112 in subsequent voice and data communications.

Figure 4A:
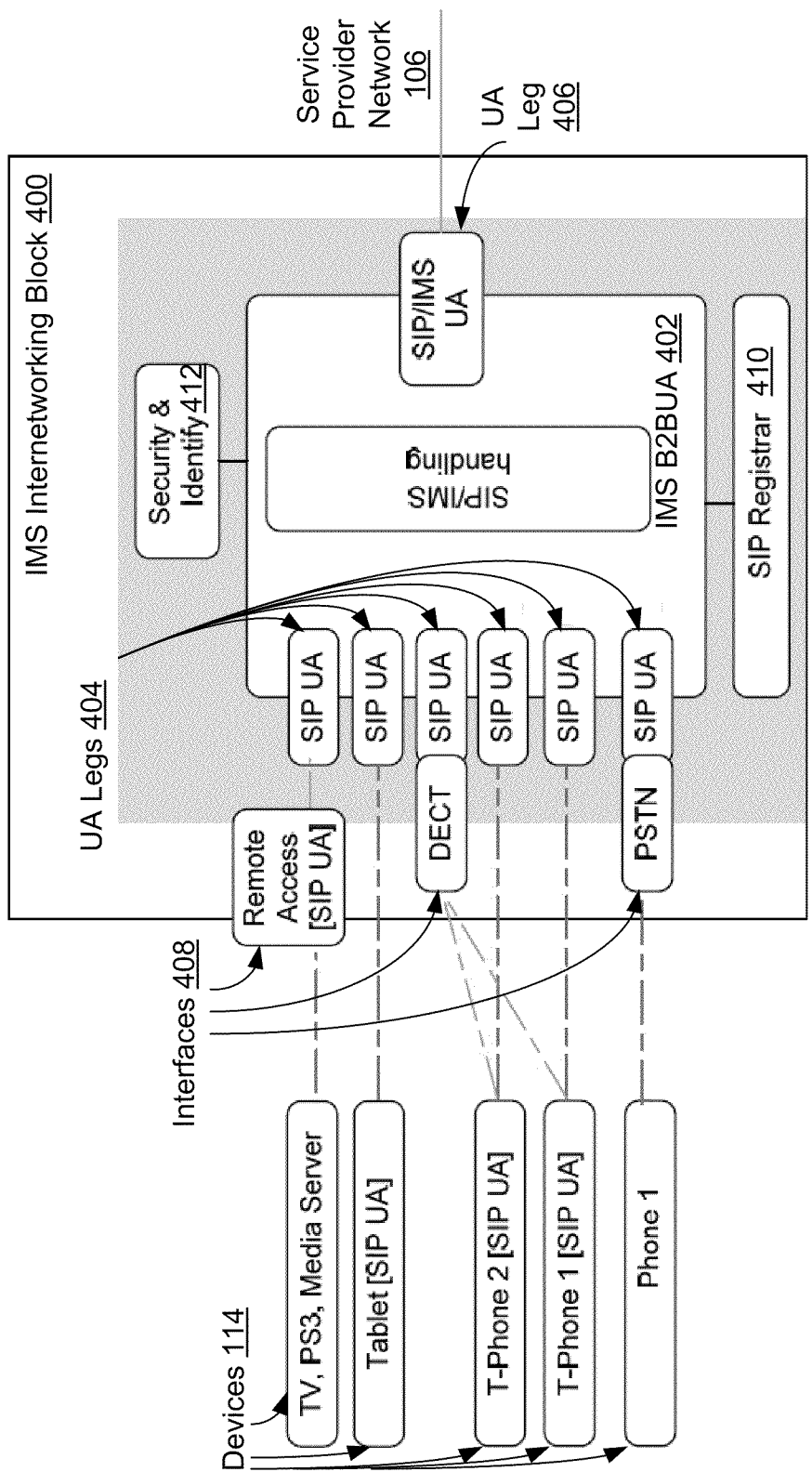
FIG. 4a illustrates an internetworking block of a home router of the home network, the internetworking block enabling the home router to act as a registrar of home network devices, in accordance with various embodiments.

FIG. 4a illustrates an internetworking block of a home router 102 of the home network 102, in accordance with various embodiments. As mentioned above, the internetworking block 400 enables the home router 102 to act as a registrar and B2BUA of devices 114. The internetworking block 400 includes B2BUA 402, the B2BUA including a plurality of user agent legs (UA legs) 404 and a UA leg 406. The UA legs 404 receive network registration requests from the devices 114 and convert the requests to IMS-compliant SIP if necessary. Some of the UA legs 404 are coupled to interfaces 408, such as remote access, DECT, and PSTN interfaces capable of receiving signals and transforming those signals into a form readable by the UA legs 404. While not shown, other interfaces 408 known in the art may be utilized as well. The UA leg 406 provides IMS-compliant SIP communications to the service provider network 106, such as IMS-compliant SIP network registration requests on behalf of the devices 114 and receives SIP responses, such as the above mentioned network registration responses. The UA legs 404 and 406 can act as UA clients/servers.

In addition to B2BUA 502, the internetworking block includes an SIP registrar 410 and a security and identity module 412. The SIP registrar 410 stores the network registration requests for later transmission if the service provider network 106 is unavailable, thereby acting as a proxy registrar of the devices 114 for the service provider network 106. The security and identity module 412 is used by the UA client 406 to authenticate the home router 102 to the IMS network of the service provider.

Figure 4B:
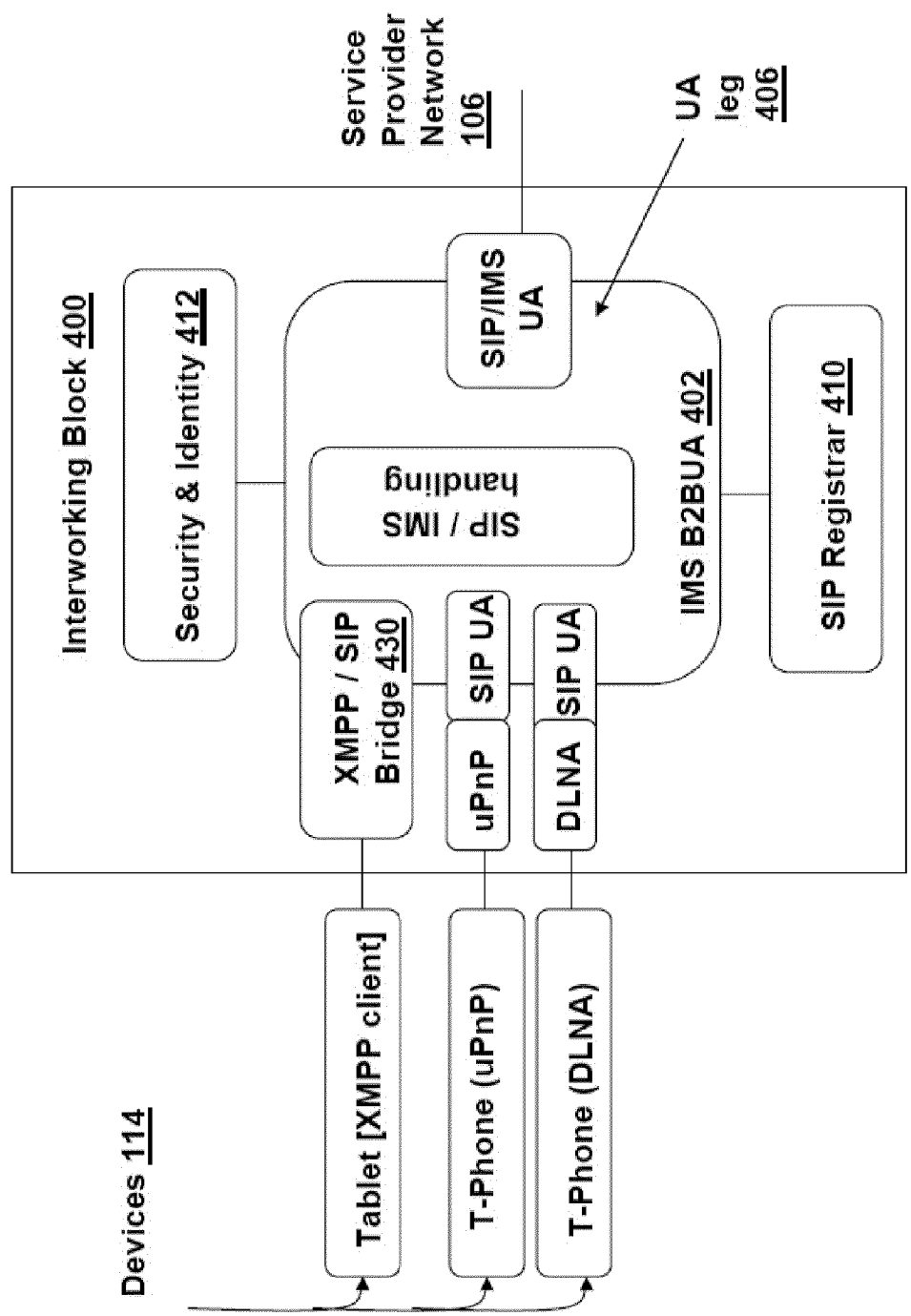
FIG. 4b illustrates an interworking block of a home router where devices in the home network support either non-SIP protocols e.g. universal Plug and Play (uPnP), Digital Living Network Alliance (DLNA) or Extensible Messaging and Presence Protocol (XMPP).

FIG. 4b illustrates an internetworking block of a home router 102 interfacing devices in the home network supporting other protocols such as Universal Plug and Play (UPnP), or Digital Living Network Alliance (DLNA), or Extensible Messaging and Presence Protocol (XMPP). One difference from FIG. 4a is the interface which interacts with the IMS B2BUA (Back-to-Back User Agent). The UPnP interface behaves as an UPnP server. The DLNA interface behaves as a DLNA server. Also, when an XMPP client registers in the home network 104, the XMPP/SIP gateway maps the XMPP identities to SIP/IMS identities and generates a network registration toward the service provider network 106. The XMPP/SIP Bridge 430 translates XMPP to SIP.

Figure 4C:
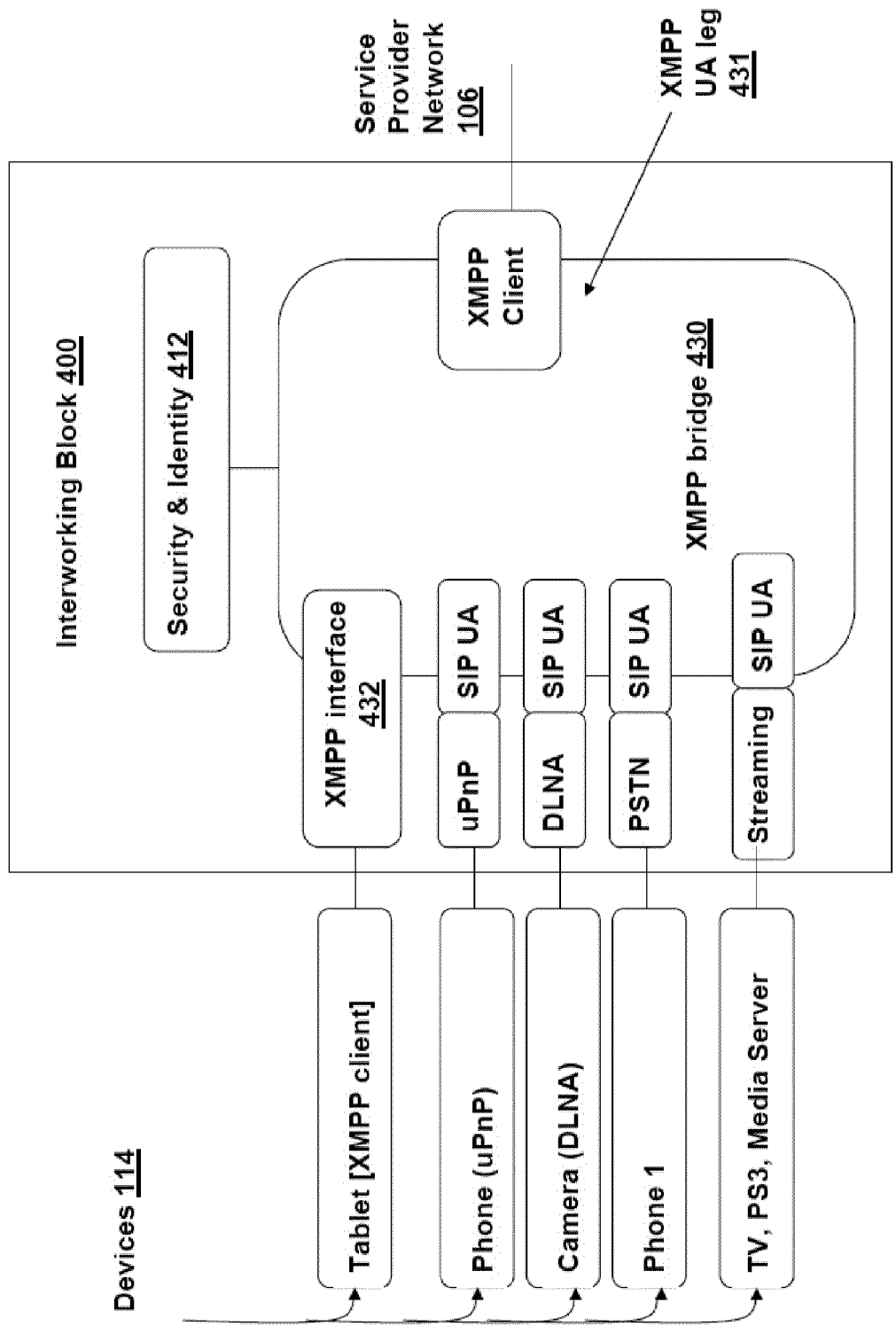
FIG. 4c illustrates an interworking block of a home router where the Service Provider Network supports a different protocol (e.g. Extensible Messaging and Presence Protocol).

FIG. 4c illustrates an internetworking block of a home router 102 in which the service provider network 106 supports Extensible Messaging and Presence Protocol (XMPP). The XMPP Bridge 430 needs to manage different identities, translates protocols such as Real Time Streaming Protocol (RTSP) or Session Initiation Protocol (possibly on different transport protocols such as UDP and TCP) and performs network registration. The XMPP UA 431 leg interfaces the service provider network 106 possibly thru another network (e.g. WAN) not shown in the figure. The XMPP interface 432 interacts with an XMPP device of the home network 104; it acts as an XMPP server.

FIG. 5 illustrates a subscription profile utilized in registering a device of the home network, in accordance with various embodiments. As illustrated, a subscription profile 500 stored by the HSS 124 includes one or more registration sets 502. The HSS 124 may store a plurality of subscription profiles 500 for a plurality of subscribers. Each subscriber profile 500 can include registration information for a home router 102 and a plurality of devices 114, or information for just one home router 102 or device 114. Each subscriber profile may also comprise a unique identifier of the subscriber, such as an account number.

In various embodiments, each registration set 502 includes a private identifier 504, such as an IMPI, a pre-provisioned public identifier 506, another public identifier 508 (both public identifiers 506 and 508 being, for example IMPUs), and a service profile 510 for each of the public identifiers 506 and 508. Each registration set 502 is specific to a home router 102 or device 114, or specific to a communication channel, such as a phone line. When specific to a communication channel, a home router 102 or device 114 having multiple such channels transfers multiple registration sets in the network registration request. Thus, in FIG. 5, the two registration sets 502 bounded in the first box are for multiple channels of a single device, and the other registration set 502 is specific to a single device or is associated with a device having a single channel.

As mentioned before, the pre-provisioned public identifiers 506 are used in matching public identifiers included in the network registration requests but not in publicly identifying the home router 102 or device 114 for voice or communication services. The service profiles 510 associated with the pre-provisioned public identifiers 506 are either dummy service profiles or are duplicates of the service profiles associated with the other public identifiers 508.

In various embodiments, the other public identifiers 508 are returned by the HSS 124 in a network registration response to enable the home router 102 and devices to utilize those public identifiers 508 in voice and data communication. In some embodiments, the same public identifier 508 is associated with multiple registration sets 502 and with multiple devices. Thus, the home router 102 and a device 114 may share a public identifier 508, multiple devices 114 may share a public identifier 508, etc. In one embodiment, all devices of the home network 104 share at least one public identifier. The sharing of a public identifier between multiple devices enables, for example, simultaneous ringing of the multiple devices in response to an incoming call. While multiple registration sets 502 include the same public identifier 508, however, each of the same public identifiers 508 is associated with a different service profile 510. Each of these service profiles 510 is utilized by an IMS server, such as the CSCF 122 in handling communications to and from a device 114 associated with a public identifier.

In some embodiments, the pre-provisioned public identifier can be used to enable device-unique 911 calling. As mentioned above, the pre-provisioned public identifier is used to register a device 114 to the service provider network 106 and that device is provided in return with a public identifier that may not be unique to the device. Since the provided public identifier may not be unique, the device 114 may be required to initiate 911 calls from its pre-provisioned public identifier, as it is important to uniquely identify the calling device 114 in a 911 call scenario. To enable the pre-provisioned public identifier to be used to make 911 calls, the pre-provisioned public identifier may be associated with a service profile that is enabled for outgoing 911 calls (i.e. 911 calls placed by end-users). As end-users are often unaware of their pre-provisioned public identifier, the pre-provisioned public identifier could also be mapped to a public identifier with which end-users are familiar. One way is to map the pre-provisioned public identifier on which the call is placed to a known public identifier by end-users with the addition of a unique extension per device. This mapping could be performed by the device 114, by the home router 102, or by the service provider 106.

In some embodiments, if a 911 call is dropped, a public safety answering point (PSAP) may be able to call back the device 114 on which the call was placed. The service provider network 106 shall maintain mappings (for some time) between the pre-provisioned public identifier and the identity provided to PSAP (which may be, for example, another public identifier known to an end-user or an extension of such a public identifier. For example, the mapping may result from the pre-provisioned public identifier being used in a SIP INVITE to the terminated S-CSCF when the other public identifiers are not unique (shared among devices).

Reestablishing a Secure Connection

Figure 7:
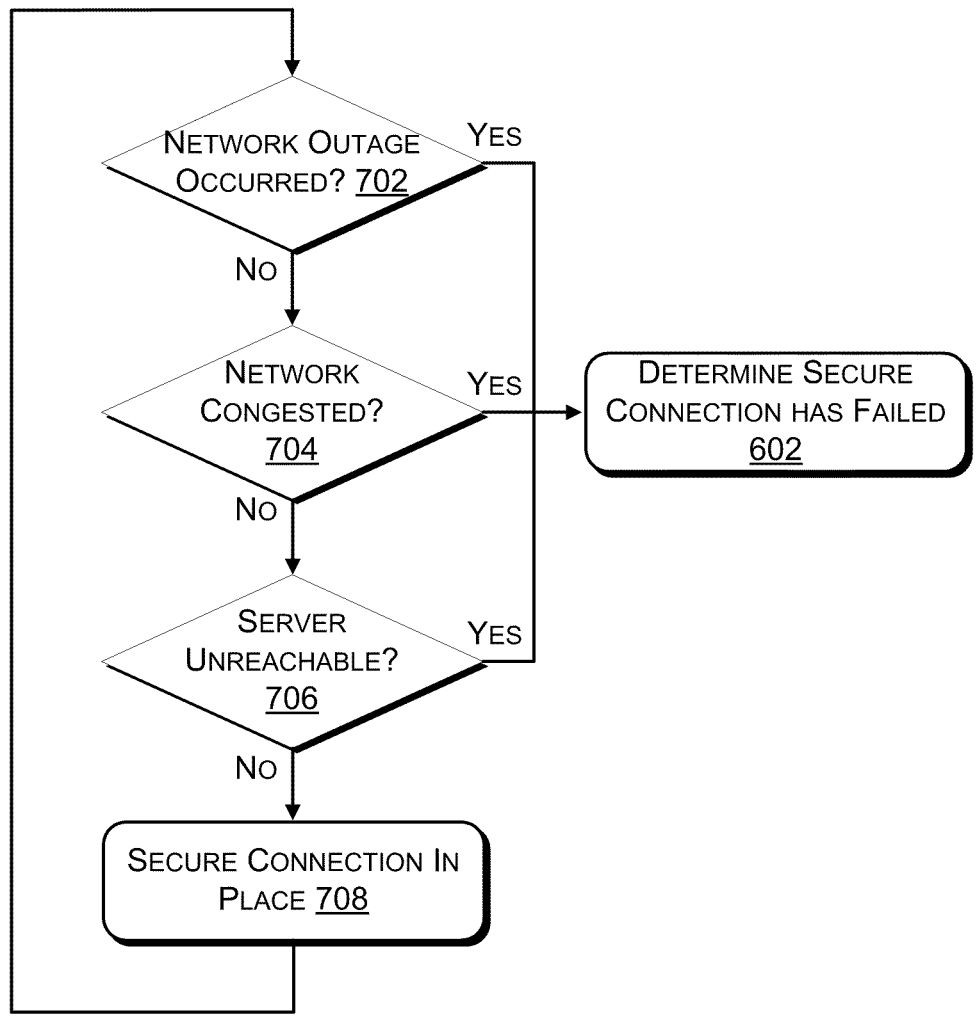
FIG. 7 illustrates a flowchart showing a method of determining whether a secure connection has failed, in accordance with various embodiments.

FIG. 6 illustrates a flowchart showing a method of attempting to reestablish a secured connection between a home router 102 of the home network 104 and the service provider network 106, in accordance with various embodiments. In various embodiments, the home router 102 initiates the method of reestablishing when the home router 102 determines 602 that a secured connection between the home router and a remote server of the service provider 106, such as a network tunnel 108 of a VPN, has failed. The home router 102 includes one or more modules capable of monitoring the secure connection, network conditions, and the reachability of the service provider network 106. The operations performed by these one or more modules are shown in FIG. 7 and described below in greater detail with reference to that figure.

In some embodiments, the one or more monitoring modules continuously perform their operations while the home router 102 and secure connection are utilized. As described above, the home router 102 and secure connection can be utilized for remote management 110 of the home router 102 and/or of a device 114 of the home network 104, or for registration 112 of a device 114 of the home network 104. The secure connection may have been established to perform the remote management 110 or registration 112, or may have been established, for example, when the home router 102 was powered-on.

Also, as described above, the secure connection may be terminated when the remote management 110 or registration 112 are complete. To prevent the one or more monitoring modules from erroneously noting a secure connection failure when the secure connection has been purposefully terminated, other modules of the home router 102 instruct the one or more monitoring modules to cease monitoring when the secure connection is terminated.

In various embodiments, after determining 602 that the secure connection has failed, the home router 102 determines whether a condition has been met before reestablishing the secure connection. As illustrated in FIG. 6, determining whether a condition has been met includes either determining 604 a time since the secure connection failed and comparing the determined time to a threshold or monitoring 606 network conditions. To determine 604 the time since the secure connection failed, the home router 102 ascertains a time at which the one or more monitoring modules indicated that the secure connection had failed, a current system time, and a difference between those times. That determined 604 time is then compared by the home router 102 to the threshold. In some embodiments, the threshold corresponds to a pre-determined time that the home router 102 is configured to wait before attempting 608 to reestablish the secure connection. The predetermined time may be set by the service provider and provided to the home router 102 in an update, for example. Also, the pre-determined time may be experimentally determined.

In some embodiments, the modules monitoring 606 the network conditions are the same as the one or more modules that determined 602 that the secure connection had failed. In other embodiments, other modules of the home router 102 perform the monitoring 606. In either case, the monitoring 606 includes at least one of monitoring network connectivity, monitoring network congestion, or ascertaining whether the service provider network 106 is reachable.

In response to determining 604 that the time since secure connection failure meets or exceeds the threshold, or in response to determining the occurrence of at least one network condition (e.g., service provider network 106 determined to be reachable), the home router 102 attempts 608 to reestablish the secure connection between the home router 102 and a remote server of the service provider network 106, such as SBC 116. As shown in FIG. 6, the attempting 608 can involve any one or more of operations 610-620.

In some embodiments, the attempting 608 includes performing the attempting in response to activation 610 of a control of the home router 102 or in response to a receiving 612 a message instructing the home router 102 to perform the attempting 608. In one embodiment, the home router 102 attempts 608 to reestablish the secure connection in response to an activation 610 or received message 612, without first determining 604 that the time meets the threshold and without monitoring 606 network conditions. Both activation 610 of a home router control and receipt 612 of a message, such as an SMS, are discussed above in greater detail. With respect to receiving 612 a message, a server of the service provider network 106 may monitor network connectivity, congestion, and reachability of the home router 102 and cause a message to be sent by, for example, the SMSC 120 of the service provider network 106 when the monitoring indicates that the secure connection can be successfully reestablished. In some embodiments, the monitoring indicates that the secure connection can be successfully reestablished when, for example, the home router 102 is determined to be reachable.

In various embodiments, the attempting 608 also or instead includes sending 614 a secure connection request, such as a VPN request. To send 614 the VPN request, the home router 102 first determines an address or locator of a device to send the request to, such as an address or locator of the SBC 116. The home router 102 may determine the address by retrieving an address or locator that has previously been provided to the home router 102. In some embodiments, the address is an IP address and is hard coded on the home router 102 or provided with an update. Also, in some embodiments, the VPN request specifies an IP address and port number of the home router 102 or an IP address of a modem to which the home router 102 is connected and a port number on which the home router 102 is listening. In various embodiments, the operations utilized to formulate and send the VPN request are performed by a VPN client of the home router 102.

In some embodiments, the attempting 608 also or instead includes utilizing 616 a binary exponential back-off (BEB) algorithm in timing repeated attempts 608 to reestablish the secure connection. The home router 102 utilizes 616 the BEB algorithm to schedule a further attempt 608 when an attempt 608 fails. The BEB algorithm schedules a first retry after a certain wait (e.g., 10 seconds) and, if that retry also fails, schedules a further retry after double the wait (e.g., 20 seconds). The BEB algorithm iteratively doubles the wait with each attempt until a max wait is reached (e.g., 24 hours). If a retry after the max wait also fails, the home router 102 ceases to attempt 608 to reestablish the secure connection.

In various embodiments, the attempting 608 also or instead includes attempting 618 to reestablish at time intervals (as with the BEB algorithm) and, if unsuccessful, attempting 618 based on network conditions. Thus, the home router 102 may attempt to reestablish the secure connection for a time limit, attempting at multiple intervals, and then wait for the presence of a network condition, such as network connectivity, before attempting 618 again.

Additionally, the attempting 608 also or instead includes attempting 620 to establish a secure connection with a second server if the first server is determined to be unreachable by monitoring 606. An identifier for the second server may be hard-coded on the home router 102 or received with an update from the service provider network 106 and stored on the home router 102.

As further illustrated in FIG. 6, a successful attempt 608 to reestablish the secure connection results in the establishing 622 of a secure connection between the home router 102 and a server of the service provider network 106. In various embodiments, in establishing 622 the secure connection, the server of the service provider network 106 assigns an IP address, such as a private IP address, to the home router 102 for use in secure communication between the server and the home router 102. That IP address is then used for communications across the secure connection. The server and home router 102 may each also perform a number of other operations to establish 622 the secure connection. Operations used to establish a secure connection such as a network tunnel 108 are known to those skilled in the art and thus need not be described further.

In various embodiments, the method illustrated in FIG. 6 is performed by a device 114 rather than in home router 102 when the secure connection is between the device 114 and the service provider network 106.

FIG. 7 illustrates a flowchart showing a method of determining 602 whether a secured connection has failed, in accordance with various embodiments. As mentioned above, one or more modules of the home router 102 monitor at least one of network connectivity, network congestion, or server reachability. The modules operate continuously while the secure connection is utilized. As illustrated in FIG. 7, the monitoring can include ascertaining network connectivity, congestion, and server reachability in a sequential fashion. In some embodiments, the modules first determine 702 whether a network outage has occurred. Determining 702 whether a network outage has occurred involves at least one of checking a status of a physical link, checking whether an IP address is a valid IP address, or performing a name server lookup. If the determining 702 indicates that an outage has occurred, the modules determine 602 that the secure connection has failed. If, on the other hand, the determining 702 indicates that an outage has not occurred, the modules determine 704 whether the network is congested. If the determining 704 indicates that the network is congested, the modules determine 602 that the secure connection has failed. If, on the other hand, the determining 704 indicates that the network is not congested, the modules determine 706 whether the server of the service provider network 106 is unreachable. If the determining 706 indicates that the server is unreachable, the modules determine 602 that the secure connection has failed. If, on the other hand, the determining 706 indicates that the server is reachable, the modules determine 708 that the secure connection remains in place. In various embodiments, upon making determination 708, the modules of the home router 102 repeat determining 702.

Example Systems

Figure 8:
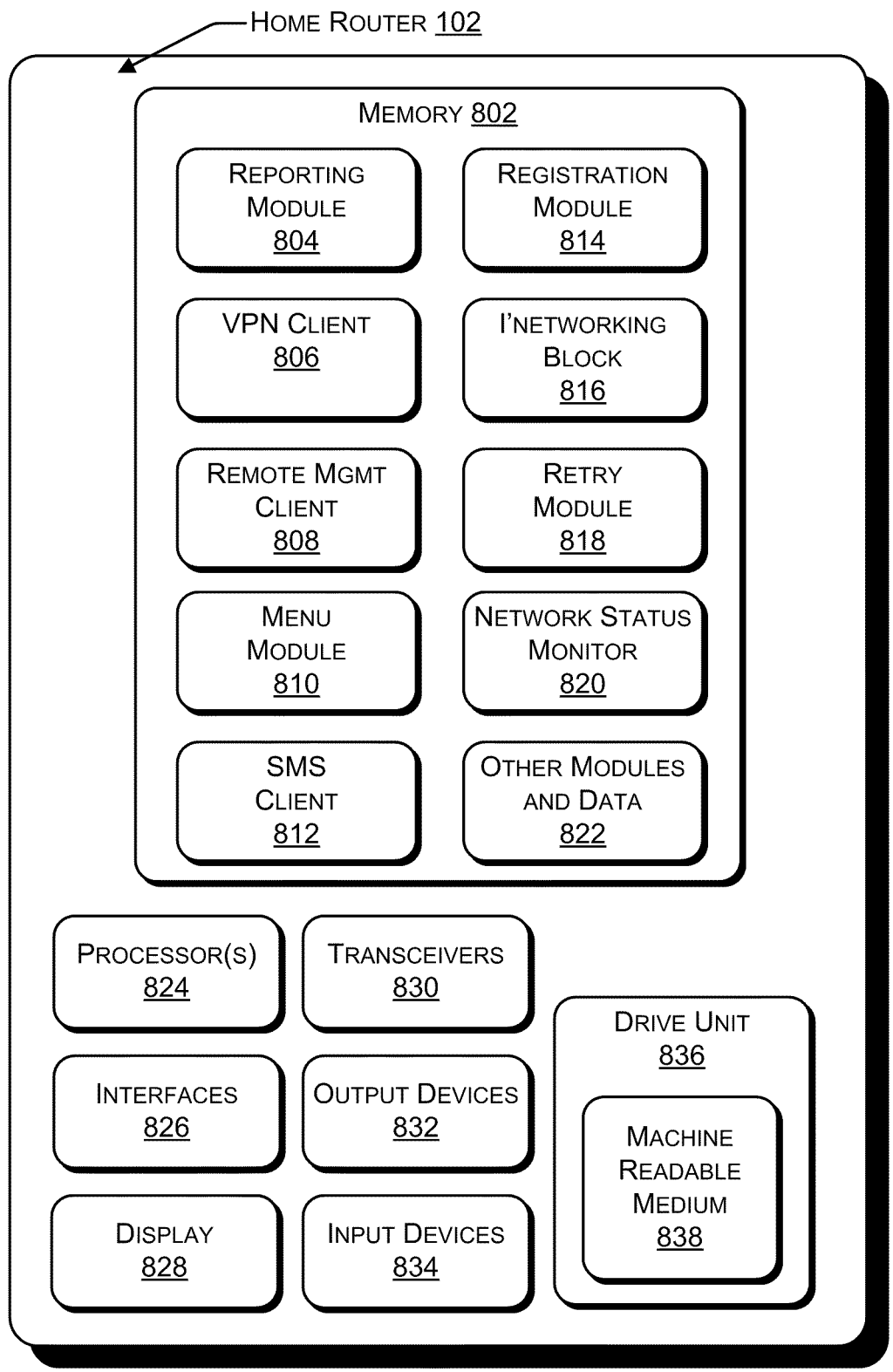
FIG. 8 illustrates a component level view of a home router of the home network, in accordance with various embodiments.

FIG. 8 illustrates a component level view of an example home router 102, in accordance with various embodiments. As shown, the home router 102 includes a memory 802, the memory storing a reporting module 804, a VPN client 806, a remote management client 808, a menu module 810, an SMS client 812, a registration module 814, an internetworking block 816, a retry module 818, a network status monitor 820, and other modules and data 822. The home router 102 further includes processor(s) 824, interfaces 826, a display 828, transceivers 830, output devices 832, input devices 834, and a drive unit 836 including a machine readable medium 838.

In various embodiments, memory 802 generally includes both volatile memory and non-volatile memory (e.g., RAM, ROM, Flash Memory, miniature hard drive, memory card, or the like). Additionally, in some embodiments, memory 802 includes one or more SIM (subscriber identity module) cards, which are removable memory cards used to identify a user of the home router 102 to the service provider network 106.

In some embodiments, the reporting module 804 is configured to gather performance metrics and create schemas and to provide those performance metrics and schemas as reports to the service provider network 106. Techniques for generating and providing reports by the home router 102 are shown in FIG. 2 and described above in detail with reference to that figure.

The VPN client 806 is configured to request the establishment of the network tunnel 108 between the home router 102 and the service provider network 106. Techniques for establishing and reestablishing the network tunnel 108 by the home router 102, which are shown in FIGS. 2 and 6, are described above in greater detail.

In various embodiments, the remote management client 808 is configured to enable remote management 110 of the home router 102 by the service provider network 106. Commands and data comprising the remote management 110 are received via the network tunnel 108 and are applied by the remote management client 808 to repair, maintain, update and configure the home router 102. Also, the remote management client 808 is configured to access settings and information about the home router 102 and to transmit these settings and information to the service provider network 106. Techniques for remotely managing 110 the home router 102, which are shown in FIGS. 1 and 2, are described above in greater detail.

The menu module 810 is configured to provide the service provider network 106 with access to a home router UI to enable troubleshooting, etc. Techniques for providing GUI access by the home router 102, which are shown in FIG. 2, are described above in greater detail.

In some embodiments, the SMS client 812 is configured to receive SMS messages from the service provider network 106 and to interpret the SMS messages to cause, for example, the VPN client 806 to request the establishment of network tunnel 108. Techniques for receiving and utilizing SMS messages are shown in FIGS. 2 and 6 and are described above in greater detail.

The registration module 814 is configured to enable registration 112 of a device 114 that is locally connected or coupled to the home router 102 with the service provider network 106. Techniques for registering 112 a device 114 by the home router 102 are shown in FIG. 3a and are described above in greater detail.

In various embodiments, the internetworking block 816 shown in FIG. 8 is a component level view of the internetworking block 400, which is shown in FIG. 4 and described above in detail with reference to that figure.

The retry module 818 is configured to attempt to reestablish a secure connection when the secure connection fails. The retry module 818 performs the attempting based on a pre-determined time or one network conditions. Techniques for attempting to reestablish a secure connection are shown in FIG. 6 and are described further above in reference to that figure.

In some embodiments, the network status monitor 820 is configured to monitor network connectivity and congestion, as well as service provider network reachability. Techniques for determining network conditions and reachability by the home router 102 are shown in FIGS. 6 and 7 and are described above in greater detail.

The other modules and data 822 are configured to route voice and data communications between the devices 114 of the home network 104 and the service provider network 106, as well as to perform other home router 102 functions.

In some embodiments, the processor(s) 824 is a central processing unit (CPU), a graphics processing unit (GPU), or both CPU and GPU, or other processing unit or component known in the art.

In various embodiments, the interfaces 826 are any sort of interfaces known in the art. Interfaces 826 include any one or more of an Ethernet interface, wireless LAN interface, a near field interface, a DECT chipset, or an interface for an RJ-11 or RJ-45 port. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. For instance, the home router 102 can use a Wi-Fi interface to communicate directly with a nearby device 114 of the home network 104. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into home router 102. Interfaces 826 can also include the interfaces 408 associated with the internetworking block 816.

In various embodiments, the display 828 is a liquid crystal display or any other type of display commonly used in telecommunication devices. For example, display 828 may be a touch-sensitive touch screen, and can then also act as an input device or keypad, such as for providing a soft-key keyboard, navigation buttons, or the like.

In some embodiments, the transceiver(s) 830 includes any sort of transceivers known in the art. For example, transceiver(s) 830 may include a radio transceiver and interface that performs the function of transmitting and receiving radio frequency communications via an antenna. The radio interface facilitates wireless connectivity between the home router 102 and various cell towers, base stations and/or access points.

In some embodiments, the output devices 832 include any sort of output devices known in the art, such as a display (already described as display 828), speakers, a vibrating mechanism, or a tactile feedback mechanism. Output devices 832 also include ports for one or more peripheral devices, such as headphones, peripheral speakers, or a peripheral display.

In various embodiments, input devices 834 include any sort of input devices known in the art. For example, input devices 834 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 838 stores one or more sets of instructions (e.g., software) embodying any one or more of the methodologies or functions described herein. The instructions may also reside, completely or at least partially, within the memory 802 and within the processor 824 during execution thereof by the home router 102. The memory 802 and the processor 824 also may constitute machine readable media 838.

Figure 9:
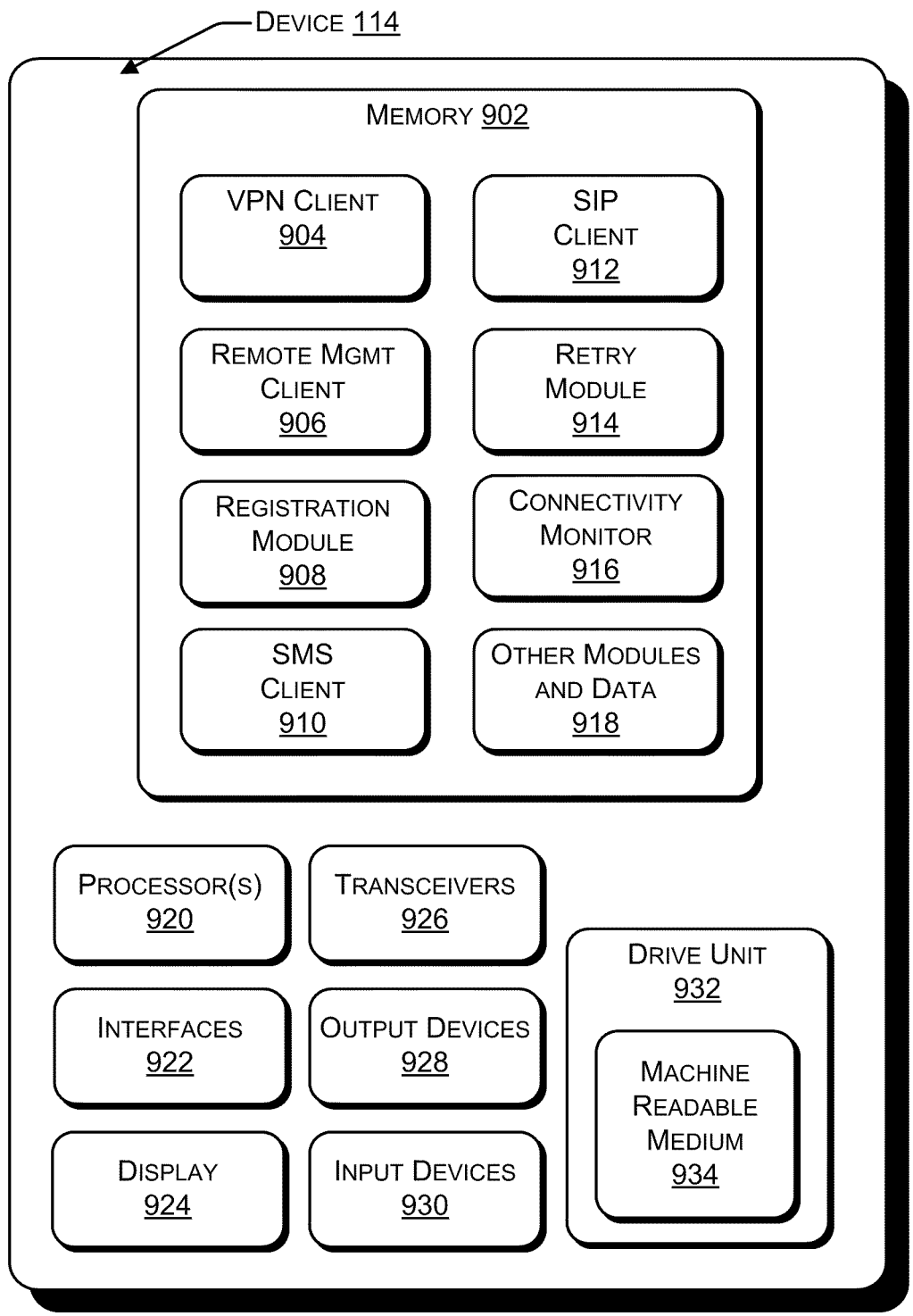
FIG. 9 illustrates a component level view of a home network device, in accordance with various embodiments.

FIG. 9 illustrates a component level view of an example device 114 of the home network 104, in accordance with various embodiments. As shown, the device 114 may include a memory 902, the memory storing a VPN client 904, a remote management client 906, a registration module 908, an SMS client 910, a SIP client 912, a retry module 914, a connectivity monitor 916, and other modules and data 918. The device 114 further includes processor(s) 920, interfaces 922, a display 924, transceivers 926, output devices 928, input devices 930, and drive unit 932 including a machine readable medium 934.

In various embodiments, memory 902 generally includes both volatile memory and non-volatile memory (e.g., RAM, ROM, Flash Memory, miniature hard drive, memory card, or the like). Additionally, in some embodiments, memory 902 includes a SIM (subscriber identity module) card, which is a removable memory card used to identify a user of the device 114 to the service provider network 106.

In some embodiments, the VPN client 904 is configured to request the establishment of the network tunnel 108 between the device 114 and the service provider network 106. Techniques for establishing and reestablishing the network tunnel 108 by the device 114, which are shown in FIGS. 3a-3b and 6, are described above in greater detail.

The remote management client 906 is configured to enable remote management 110 of the device 114 by the service provider network 106. Commands and data comprising the remote management 110 are received via the home router 102 and network tunnel 108 and are applied by the remote management client 906 to repair, maintain, update and configure the device 114. Also, the remote management client 906 is configured to access settings and information about the device 114 and to provide those settings and information to the home router 102 for transmission to the service provider network 106. Techniques for remotely managing 110 the device 114, which are shown in FIGS. 1 and 2, are described above in greater detail.

In various embodiments, the registration module 908 is configured to formulate a network registration request and receive a network registration response, the response including a public identifier that is useable by the device 114 in voice and data communication. Techniques for registering 112 the device 112, which are shown in FIGS. 3a-3b, are described above in greater detail.

The SMS client 910 is configured to receive SMS messages from the service provider network 106 and to interpret and/or make available the SMS messages to cause, for example, the VPN client 904 to request the establishment of network tunnel 108. Techniques for receiving and utilizing SMS messages are shown in FIGS. 3a-3b and 6 and are described above in greater detail.

In some embodiments, the SIP client 912 is configured to formulate the network registration request provided by the registration module 908 as a SIP register request. Techniques for formulating a request as a SIP register request are shown in FIGS. 3a-3b and are described above in greater detail.

The retry module 914 is configured to attempt to reestablish a secure connection when the secure connection fails. The retry module 914 performs the attempting based on a pre-determined time or one network conditions. Techniques for attempting to reestablish a secure connection are shown in FIG. 6 and are described further above in reference to that figure.

In various embodiments, the connectivity module 916 is configured to determine network conditions and server reachability, as well as whether the device 114 is connected to or in the vicinity of the home router 102. Techniques for determining conditions and connectivity are shown in FIGS. 3a-3b, 6, and 7 and are described above in greater detail.

The other modules and data 918 are modules for enabling voice and data communications to and from the device 114 as well as other modules for any other number of device functions for telecommunications, media, and computing devices known in the art.

In some embodiments, the processor(s) 920 is a central processing unit (CPU), a graphics processing unit (GPU), or both CPU and GPU, or other processing unit or component known in the art.

In various embodiments, the interfaces 922 are any sort of interfaces known in the art. Interfaces 922 include any one or more of an Ethernet interface, wireless LAN interface, a near field interface, a DECT chipset, or an interface for an RJ-11 or RJ-45 port. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. For instance, the device 114 can use a Wi-Fi interface to communicate directly with a nearby home router 102 of the home network 104. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into device 114.

In various embodiments, the display 924 is a liquid crystal display or any other type of display commonly used in telecommunication devices. For example, display 924 may be a touch-sensitive display screen, and can then also act as an input device or keypad, such as for providing a soft-key keyboard, navigation buttons, or the like.

In some embodiments, the transceivers 926 include any sort of transceivers known in the art. For example, transceivers 926 may include a radio transceiver and interface that performs the function of transmitting and receiving radio frequency communications via an antenna. The radio interface facilitates wireless connectivity between the device 114 and various cell towers, base stations and/or access points.

In some embodiments, the output devices 928 include any sort of output devices known in the art, such as a display (already described as display 924), speakers, a vibrating mechanism, or a tactile feedback mechanism. Output devices 928 also include ports for one or more peripheral devices, such as headphones, peripheral speakers, or a peripheral display.

In various embodiments, input devices 930 include any sort of input devices known in the art. For example, input devices 930 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 934 stores one or more sets of instructions (e.g., software) embodying any one or more of the methodologies or functions described herein. The instructions may also reside, completely or at least partially, within the memory 902 and within the processor 920 during execution thereof by the device 114. The memory 902 and the processor 920 also may constitute machine readable media 934.

Figure 10:
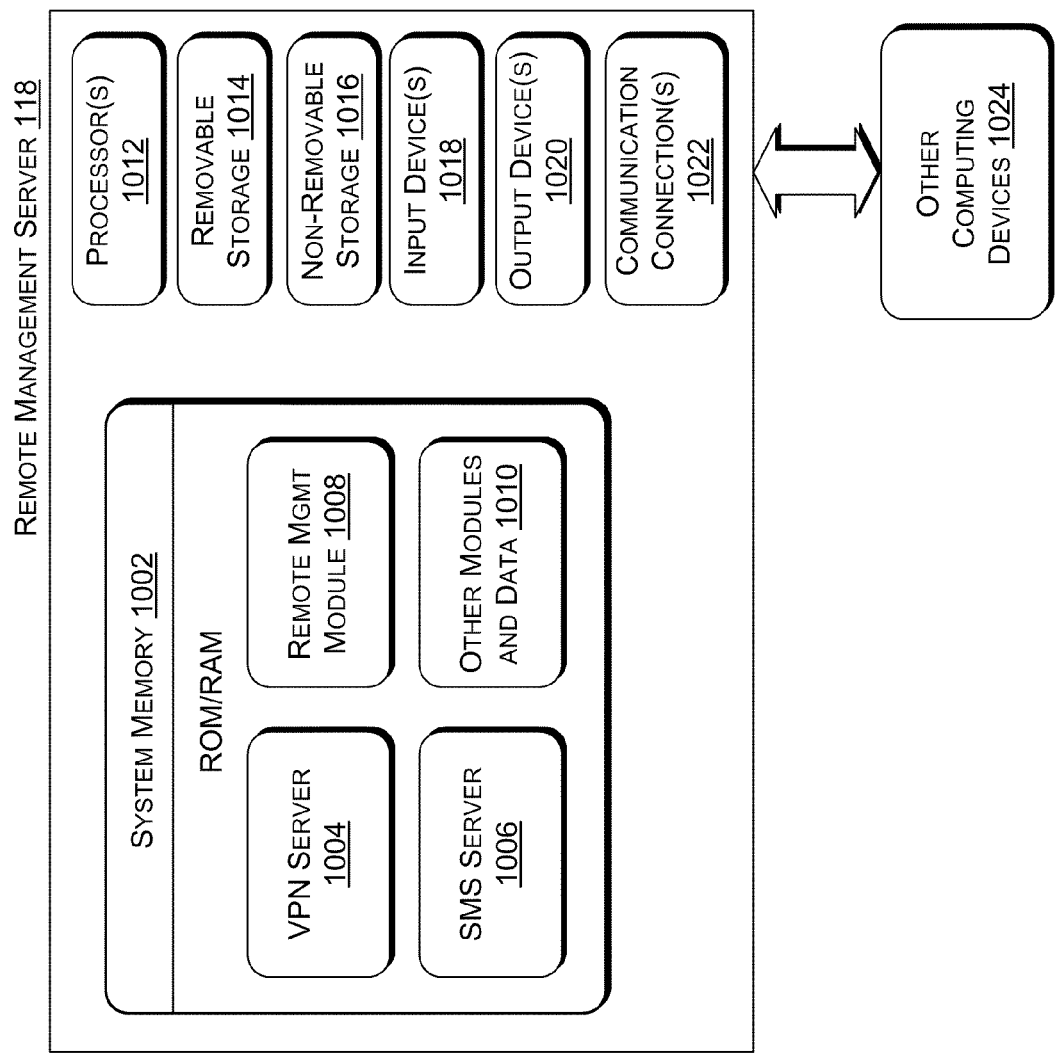
FIG. 10 illustrates a component level view of a server of the service provider network, in accordance with various embodiments.

FIG. 10 illustrates a component level view of a server of the service provider network 106, in accordance with various embodiments. While the server illustrated in FIG. 10 is shown as RMS 118, the component level view shown in FIG. 10 may also represent components of other servers of the service provider network 106, such as SBC 116, SMSC 120, CSCF 122, and HSS 124. As illustrated, RMS 118 comprises a system memory 1002 storing a VPN server 1004, an SMS server 1006, a remote management module 1008, and other modules and data 1010. Also, RMS 118 includes processor(s) 1012, a removable storage 1014 and non-removable storage 1016, input device(s) 1018, output device(s) 1020 and communication connections 1022 for communicating with other computing devices 1024.

In various embodiments, system memory 1002 is volatile (such as RAM), non-volatile (such as ROM, flash memory, etc.) or some combination of the two.

The VPN server 1004 is configured to establish a network tunnel 108 with another device, such as the home router 102. Techniques for establishing and reestablishing the network tunnel 108, which are shown in FIGS. 2, 3a-3b, and 6, are described above in greater detail. Such techniques are performed by a VPN server 1004. In some embodiments, rather than forming a part of the RMS 118, the VPN server 1004 instead is a component of another device, such as a component of the SBC 116.

The SMS server 1006 is configured to send an SMS message to another device, such as a home router 102. Techniques for sending an SMS—and causing an SMS to be sent—are shown in FIGS. 2 and 6 and are described above in greater detail. Such techniques are performed by a SMS server 1006. In some embodiments, rather than forming a part of the RMS 118, the SMS server 1006 instead is a component of another device, such as a component of the SMSC 120.

In various embodiments, the remote management module 1006 is configured to remotely manage 110 devices such as the home router 102 and devices 114. Techniques remotely managing 110 devices are shown in FIG. 2 and are described above in greater detail. Such techniques are performed by the remote management module 1006.

In some embodiments, other modules and data perform or enable performing any other action taken by the service provider network 106. Such additional actions are shown in FIGS. 2 and 3*a*-3*b* and are described above in greater detail.

In some embodiments, the processor(s) 1012 is a central processing unit (CPU), a graphics processing unit (GPU), or both CPU and GPU, or other processing unit or component known in the art.

RMS 118 also includes additional data storage devices (removable and/or non-removable) such as, for example, magnetic disks, optical disks, or tape. Such additional storage is illustrated in FIG. 10 by removable storage 1014 and non-removable storage 1016. Computer storage media may include volatile and nonvolatile, removable and non-removable media implemented in any method or technology for storage of information, such as computer readable instructions, data structures, program modules, or other data. System memory 1002, removable storage 1014 and non-removable storage 1016 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by RMS 118. Any such computer-readable storage media may be part of RMS 118.

In various embodiment, any or all of system memory 1002, removable storage 1014, and non-removable storage 1016, store programming instructions which, when executed, implement some or all of the above-described operations of the RMS 118.

RMS 118 also has input device(s) 1018, such as a keyboard, a mouse, a touch-sensitive display, voice input device, etc., and output device(s) 1020 such as a display, speakers, a printer, etc. These devices are well known in the art and need not be discussed at length here.

RMS 118 also contains communication connections 1022 that allow the RMS 118 to communicate with other computing devices 1022, such as other servers of the service provider network 106, including the SBC 116, the SMSC 120, the CSCF 122, and the HSS 124.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A computer-implemented method comprising:
    establishing a network tunnel between a home router and a remote service provider;
    sending a schema with home network information from the home router to the remote service provider, the schema including diagnostic information associated with a malfunction of the home router or at least one other device that is locally connected to the home router or locally coupled to the home router; and
    in response to sending the schema, receiving via the network tunnel remote management of the home router and the at least one other device, wherein the remote management includes a repair of the malfunction of the home router or the at least one other device.

2. The method of claim 1, wherein the remote management further includes at least one of maintaining, updating, configuring, provisioning, or analytics.

3. The method of claim 1, further comprising initiating the network tunnel by sending a request from the home router to the remote service provider.

4. The method of claim 3, further comprising performing the initiating in response to receiving an activation of a control associated with the home router.

5. The method of claim 3, further comprising performing the initiating in response to receiving a message from the remote service provider.

6. The method of claim 1, further comprising sending a status report from the home router to the remote service provider.

7. A home router comprising:
    a processor;
    a physical control communicatively coupled to the processor for initiating a network tunnel between the home router and a remote service provider; and
    a plurality of executable instructions communicatively coupled to the control and operated by the processor to configure the home router to perform operations including:
        initiating the network tunnel with the remote service provider in response to an activation of the control;
        establishing the network tunnel between the home router and the remote service provider;
        sending a schema with home network information from the home router to the remote service provider; and
        receiving via the network tunnel at least one of commands or data from the remote service provider for management of the home router and at least one other device that is locally connected or coupled to the home router, wherein the commands or data for management include repairs, updates, configurations, maintenance, provisioning, and analytics.

8. The home router of claim 7, wherein the operations further comprise sending a status report from the home router to the remote service provider.

9. The home router of claim 7, wherein the home router and the at least one other device form a home network.

10. The home router of claim 7, further comprising additional executable instructions operated by the processor to configure the home router to initiate the network tunnel with the remote service provider in response to receiving a message from the remote service provider.

11. The home router of claim 10, wherein the remote service provider includes a remote management service and a messaging service, the remote management service directing the messaging service to transmit the message to the home router.

12. One or more computer-readable storage media having computer-executable instructions stored thereon and configured to program a home router to perform operations comprising:

establishing a network tunnel between a home router and a remote service provider;

sending a schema with home network information from the home router to the remote service provider, the schema including diagnostic information associated with a malfunction of the home router or at least one other device that is locally connected to the home router or locally coupled to the home router; and in response to sending the schema, receiving via the network tunnel remote management of the home router and the at least one other device, wherein the remote management includes a repair of the malfunction of the home router or the at least one other device.

13. The one or more computer-readable storage media of claim 12, wherein the remote management further includes at least one of maintaining, updating, configuring, provisioning, or analytics.

14. The one or more computer-readable storage media of claim 12, wherein the operations further comprise initiating the network tunnel by sending a request from the home router to the remote service provider.

15. The one or more computer-readable storage media of claim 14, wherein the operations further comprise performing the initiating in response to receiving an activation of a control associated with the home router.

16. The one or more computer-readable storage media of claim 14, wherein the operations further comprise performing the initiating in response to receiving a message from the remote service provider.

17. The one or more computer-readable storage media of claim 12, wherein the remote service provider includes a remote management service and a messaging service, the remote management service directing the messaging service to transmit the message to the home router.

18. The one or more computer-readable storage media of claim 12, wherein the operations further comprise sending a status report from the home router to the remote service provider.

19. The one or more computer-readable storage media of claim 12, wherein the home router and the at least one other device form a home network.

* * * * *